United States Patent [19]
Bodmer

[11] Patent Number: 5,716,297
[45] Date of Patent: Feb. 10, 1998

[54] DERAILLEUR ARRANGEMENT FOR BICYCLES

[75] Inventor: Jörg Bodmer, Schweinfurt, Germany

[73] Assignee: Fichtel & Sachs AG, Schweinfurt, Germany

[21] Appl. No.: 535,624

[22] Filed: Sep. 28, 1995

Related U.S. Application Data

[63] Continuation-in-part of Ser. No. 304,136, Sep. 12, 1994, Pat. No. 5,503,598.

[30] Foreign Application Priority Data

Sep. 13, 1993 [DE] Germany ............... 43 30 989.5
Sep. 29, 1994 [DE] Germany ............... 44 34 752.9

[51] Int. Cl.⁶ .................................................. F16H 59/00
[52] U.S. Cl. ........................................ 474/78; 474/160
[58] Field of Search ............................ 474/78–80, 160

[56] References Cited

U.S. PATENT DOCUMENTS

| | | |
|---|---|---|
| 4,348,200 | 9/1982 | Terada ........................... 474/160 |
| 4,384,865 | 5/1983 | Ueno ........................... 474/162 X |
| 5,066,264 | 11/1991 | Romano ........................ 474/80 X |
| 5,192,249 | 3/1993 | Nagano ......................... 474/160 |
| 5,503,598 | 4/1996 | Neuer et al. .................. 474/160 X |

FOREIGN PATENT DOCUMENTS

| | | |
|---|---|---|
| 0008851 | 3/1980 | European Pat. Off. . |
| 0429007 | 5/1991 | European Pat. Off. . |
| 0444645 | 9/1991 | European Pat. Off. . |
| 0474139 | 3/1992 | European Pat. Off. . |
| 0642972 | 3/1995 | European Pat. Off. . |
| 2467135 | 4/1981 | France . |
| 2657134 | 7/1991 | France . |
| 3936921 | 5/1990 | Germany . |
| 2005363 | 4/1979 | United Kingdom . |

*Primary Examiner*—Roger J. Schoeppel
*Attorney, Agent, or Firm*—Nils H. Ljungman and Associates

[57] ABSTRACT

Derailleur with at least two sprockets on a sprocket unit, which is designed so that the chain can be easily shifted between a smaller sprocket and a larger sprocket. For this purpose, at least on the larger sprocket, there is a tooth space which forms a lane for the transfer of the chain between the two sprockets. By means of a side plate support ramp on the larger sprocket, a path of a chain transfer segment which is convexly bent or curved radially outward, viewed in the axial direction, is achieved, whereby the chain transfer segment is formed during the chain transfer from the smaller sprocket to the larger sprocket in the vicinity of the double tooth space.

20 Claims, 17 Drawing Sheets

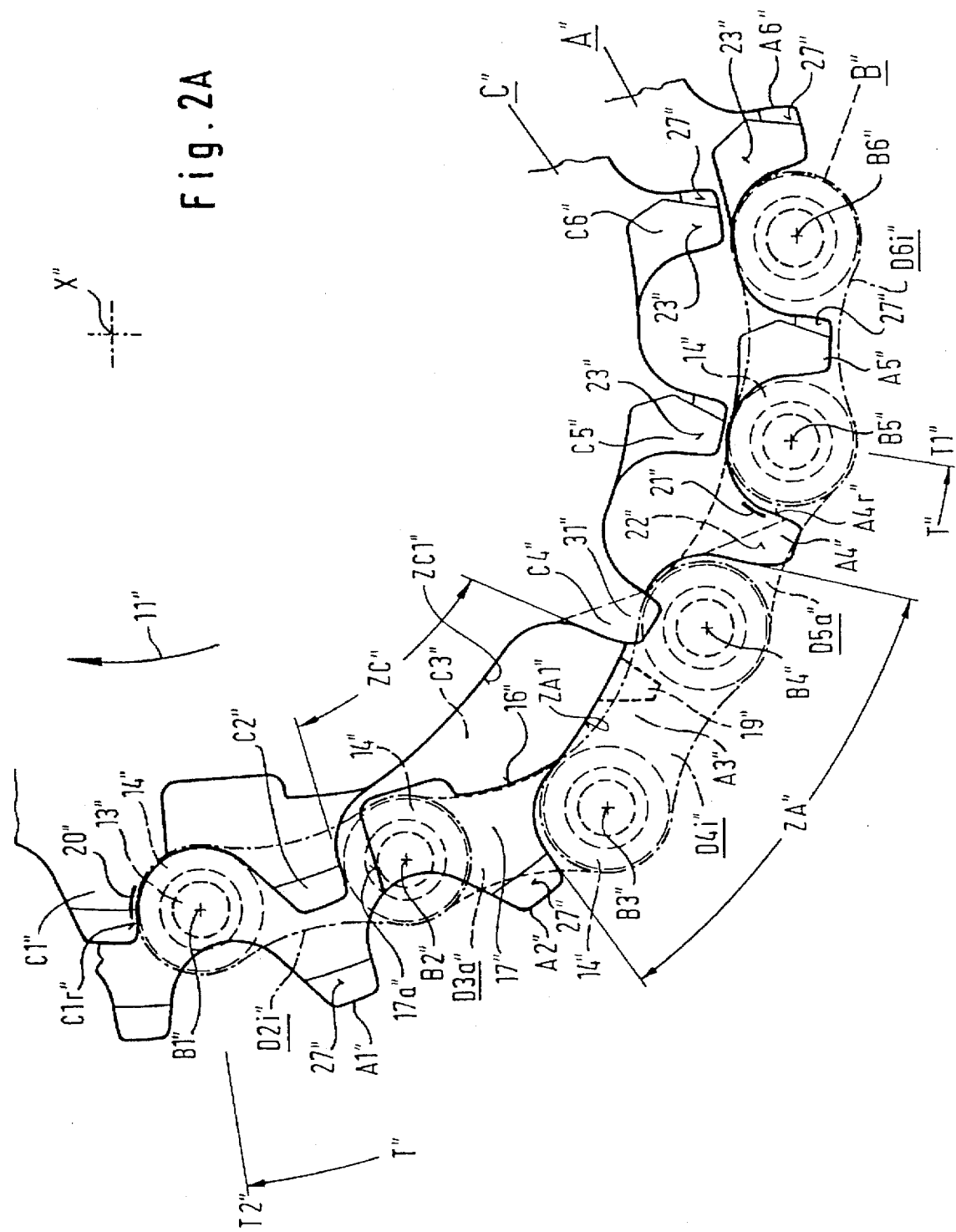

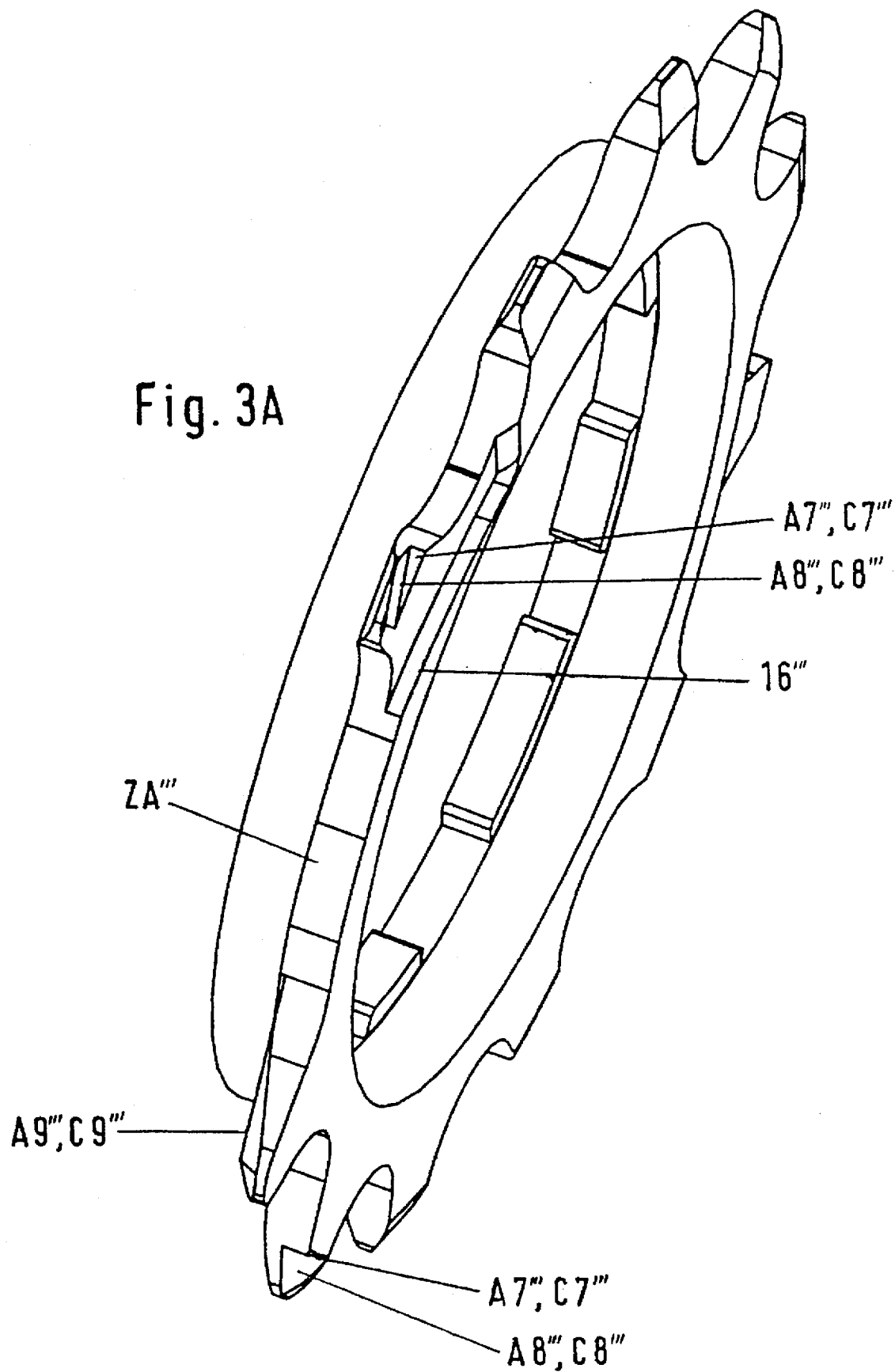

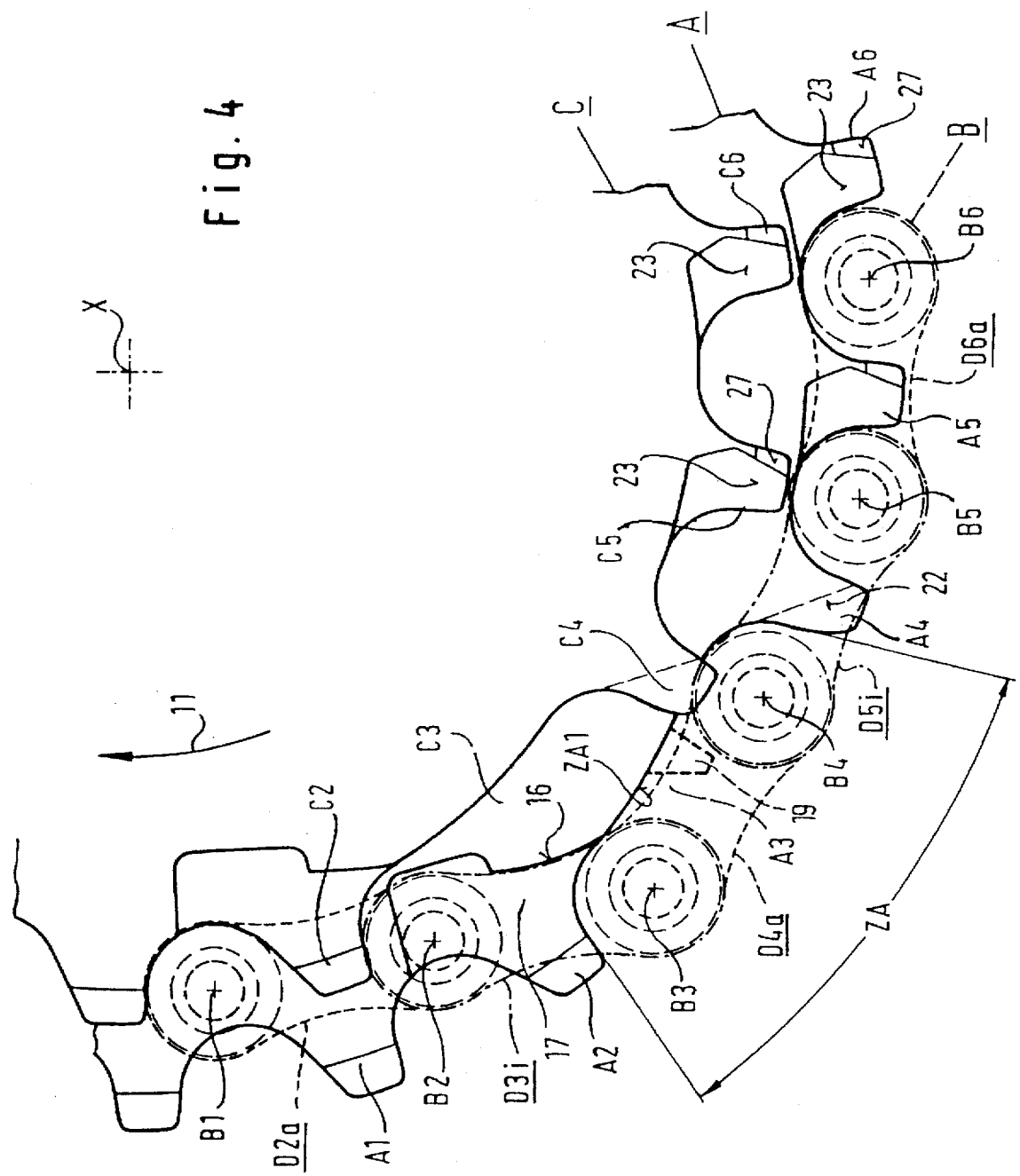

DERAILLEUR ARRANGEMENT FOR BICYCLES

CROSS-REFERENCE TO RELATED APPLICATION

The present application is a continuation-in-part of U.S. patent application Ser. No. 08/304,136, filed on Sep. 12, 1994, now U.S. Pat. No. 5,503,598, issued Apr. 2, 1996, by Andreas Neuer and Jörg Bodmer and entitled "Derailleur Arrangement, in Particular for Bicycles".

BACKGROUND OF THE INVENTION

1. Field of the Invention

The present invention generally relates to a derailleur, in particular for bicycles, comprising a driving sprocket unit and a driven sprocket unit as well as a chain which connects these two sprocket units to one another, whereby at least one of the sprocket units is designed as a multi-sprocket unit with at least two sprockets, namely a larger sprocket and a smaller sprocket, whereby additionally, the two sprockets of the multi-sprocket unit each have a number of teeth and at least one tooth space formed between each tooth pair, whereby, additionally, the chain is formed by successive chain links, inner side plate pairs and outer side plate pairs in alternating sequence between the chain links, whereby additionally, to shift the chain between the two sprockets of the multi-sprocket unit, there is a shifting device in an inlet area, which in the normal direction of rotation of the chain and of the sprockets runs the chain into the multi-sprocket unit, and this shifting device is designed to impart movements to the chain in a direction which is parallel to the axis of the multi-sprocket unit, whereby additionally, during the shifting of the chain between the sprockets of the multi-sprocket unit, a chain transfer segment is formed between a formerly-occupied sprocket and a newly-occupied sprocket of the two sprockets, which chain transfer segment traverses the circulation area of the multisprocket unit from the chain inlet area to a chain outlet area of the multisprocket unit, whereby additionally, the chain transfer segment extends opposite to the normal direction of circulation of the sprocket set from a chain link which is the last chain link engaged between two final teeth of a final tooth pair of the formerly-occupied sprocket to a chain link which is the first link engaged between two first teeth of a first tooth pair of the newly-occupied sprocket, and whereby in at least a chain transfer circumferential area of the multisprocket unit corresponding to the direction of chain shifting from a smaller sprocket to a larger sprocket, measures are provided on the sprockets to facilitate the shifting of the chain in this chain transfer circumferential area between the two sprockets from the smaller sprocket to the larger sprocket, and to define the path of the corresponding chain transfer segment.

2. Background Information

Among known derailleurs are those, such as disclosed in German Laid Open Patent Application No. 39 36 921, in which the system of sprockets consists of at least one large sprocket provided with teeth and one small sprocket provided with teeth, which sprockets are next to one another and can be optionally engaged in a bicycle drive chain which consists of a series of pivoting connecting plates connected to one another to form a closed loop. The teeth of the small sprocket have such a phase relationship referring to the chain of the connecting area of the large sprocket, that a tooth of a smaller sprocket is, referring to the reference tooth, located there underneath. These teeth engage in the chain, when the connecting area of the chain and when the chain of the inserting area of the reference tooth is picked up. For the correct chain shifting action from the small sprocket to the large sprocket, there is a cut-out area, i.e. one with shortened teeth. In front of these teeth, deflector bevels are attached, so that the chain can only be shifted when the chain has been displaced laterally and is running over the shortened teeth of the smaller and next-larger sprocket.

One disadvantage of this arrangement is that longer lengths are generally necessary for shifting in the circumferential direction, and that primarily on small sprockets, sufficient room for such a shifting position cannot generally be provided for the shifting from the larger to the smaller sprocket. Such a shift point tends to require several teeth located one behind the other on the larger sprocket, which must usually be designed with a special shape (deflector, ramps, bevel). Moreover, there tends to be increased wear on the sprockets on account of the shortened teeth.

OBJECT OF THE INVENTION

An object of the present invention, in accordance with at least one preferred embodiment, is to further facilitate the transfer of the chain, in particular from the larger sprocket to the smaller sprocket, but also if necessary from the smaller sprocket to the larger sprocket, and also to make it possible to have small differences in the number of teeth. In particular, it is an object of the invention to essentially guarantee that if a transfer is to be made under load from one sprocket to another, this transfer can be made quietly, safely and smoothly, so that the chain is engaged with the newly selected sprocket as rapidly as possible.

SUMMARY OF THE INVENTION

The invention teaches that this object can be accomplished, in accordance with at least one preferred embodiment, by the combination of the following features:

a) in the chain transfer circumferential area corresponding to the shifting from the smaller sprocket to the larger sprocket, one tooth is omitted on the sprocket next to the smaller sprocket, forming a double tooth space, which in the normal direction of circulation follows the preceding first tooth of the first tooth pair of the larger sprocket;

b) on the large sprocket, on its lateral surface facing the smaller sprocket, in the base area of a tooth which precedes the double tooth space in the normal direction of circulation and, if desired, a side plate support ramp is formed in the leading terminal area of the double tooth space, which side plate support ramp, in the normal direction of circulation, trails the trailing final tooth of the final tooth pair of the smaller sprocket;

c) as a result of the side plate support ramp and a base of the double tooth space, a path of the chain transfer segment which is convexly bent or curved radially outward—seen in the axial direction—is forced inside the chain transfer circumferential area between the first tooth pair of the larger sprocket and the final tooth pair of the smaller sprocket, whereby the curved chain transfer segment empties into the tooth space between the last two teeth of the final tooth pair of the smaller sprocket; and d) the leading first tooth of the first tooth pair of the larger sprocket in the normal direction of circulation is designed for engagement both between the side plates of an inner side plate pair and also between the side plates of an outer side plate pair.

In an additional advantageous feature, in the normal direction of circulation, the tooth located ahead of the tooth space—viewed in the axial direction—has an external indentation, including an outside surface running in the circumferential direction to support the chain inner side plate, and has a diagonal surface perpendicular to the outside surface which is used for the passage of the chain, and/or that, following the tooth space in the direction of circulation of the second tooth, there is an indentation including an outer surface which runs in the direction of circulation, to support the chain inner side plate, and a diagonal surface perpendicular to the outside surface which is used for the passage of the chain.

As contemplated by the present invention, it is thereby advantageous that it is possible to safely and reliably shift the chain to the smaller sprockets. During gear shifting involving sprockets which have small differences in the number of teeth, the tip circle of the next-smaller sprocket is only slightly smaller than the tip circle of the initial sprocket. The indentations or shift ramps are preferably realized both on the tooth preceding the tooth space in the direction of circulation, and also on the second tooth following the tooth space, on the outside in the axial direction, so that when there is a displacement of the derailleur, the chain inner side plates are placed on the above-mentioned indentations or shift ramps, and thus surmount, or climb up over the points of the tip circle of the smaller sprocket which are precisely matched to one another.

In one favorable embodiment, a tooth with an indentation located on the outside when viewed in the axial direction, trails the tooth with the bevel in the direction of circulation.

In an additional embodiment, a tooth space precedes the tooth with the bevel in the direction of circulation.

In this case, the invention teaches that it can be advantageous, to improve shifting between sprockets which have only small differences in the number of teeth, if there is a tooth space on the smaller sprocket preceding the shift lane on the larger sprocket by a central angle, so that the tooth, which catches the chain, which is required on the smaller sprocket, can simultaneously be used as an active shifting switch to the larger sprocket.

As contemplated in connection with an additional advantageous feature, there is at least one space between two successive teeth of a sprocket, whereby the base of the tooth in the roller support area of the tooth space is higher than the root circle of the bases of the other teeth, at least in the trailing area in the direction of circulation.

It is thereby advantageous that, in the area of the tooth space, there is preferably a chain length adjustment which guarantees that the chain runs smoothly through the tooth space. On sprockets with low numbers of teeth, the length of the chain can generally no longer be adjusted by changing the central angle. As a result of the elevation of the root circle of the tooth space in the vicinity of the trailing roller support in the circumferential direction, the central angle of the standard teeth can be retained. The amount of elevation of the root circle is thereby determined so that the pivoting in and out of the chain bolt, or roller, on the tooth bordering the double space on the leading edge in the direction of circulation in no way differs from the action of standard teeth.

The above discussed embodiments of the present invention will be described further hereinbelow with reference to the accompanying figures. When the word "invention" is used in this specification, the word "invention" includes "inventions", that is, the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

In summary, one aspect of the invention resides broadly in a derailleur arrangement, in particular for bicycles, comprising a driving chain wheel unit and a driven chain wheel unit as well as a chain which connects these two sprocket units to one another, whereby at least one of the sprocket units is designed as a multi-sprocket unit with at least two sprockets, namely a larger sprocket and a smaller sprocket, whereby additionally, the two sprockets of the multi-sprocket unit each have a number of teeth and at least one tooth space formed between each tooth pair, whereby, additionally, the chain is formed by successive chain links, inner side plate pairs and outer side plate pairs in alternating sequence between the chain links, whereby additionally, to shift the chain between the two sprockets of the multi-sprocket unit, there is a shifting device in an inlet area, which in the normal direction of rotation of the chain and of the sprockets runs the chain into the multi-sprocket unit, and this shifting device is designed to impart movements to the chain in a direction which is parallel to the axis of the multi-sprocket unit, whereby additionally, during the shifting of the chain between the sprockets of the multi-sprocket unit, a chain transfer segment is formed between a formerly-occupied sprocket and a newly-occupied sprocket of the two sprockets, which chain transition segment traverses the circulation area of the multisprocket unit from the chain inlet area to a chain outlet area of the multisprocket unit, whereby additionally, the chain transfer segment extends opposite to the normal direction of circulation of the sprocket set from a chain link which is the last chain link engaged between two final teeth of a final tooth pair of the formerly-occupied sprocket, to a chain link, which is the first link engaged between two first teeth of a first tooth pair, of the newly-occupied sprocket, and whereby in at least a chain transfer circumferential area of the multisprocket unit corresponding to the direction of chain shifting in the direction from a smaller sprocket to a larger sprocket, measures are provided on the sprockets to facilitate the shifting of the chain in this chain transfer circumferential area between the two sprockets from the smaller sprocket of the larger sprocket, and to define the path of the corresponding chain transfer segment, characterized by the fact that there is at least one space between two successive teeth of a sprocket, whereby the base of the tooth in the roller support area of the tooth space has an elevation, at least in the area trailing in the direction of circulation, with respect to the root circle of the bases of the other teeth.

Another aspect of the invention resides broadly in a derailleur arrangement for a manually powered vehicle, such as a bicycle, such a vehicle having at least one wheel, at least one wheel hub mounted on the at least one wheel, and a chain for providing a torsional force to be transferred to the at least one wheel hub, the derailleur arrangement comprising: a first sprocket; the first sprocket having: means for connecting with a wheel hub of the manually powered vehicle; means for receiving a torsional force from the chain and transferring the torsional force to the hub; a second sprocket; the second sprocket having: means for connecting with a wheel hub of the manually powered vehicle; means for receiving a torsional force from the chain and transferring the torsional force to the hub; the first sprocket and the second sprocket having a common axis of rotation; the first sprocket and the second sprocket each having a plane of rotation; means for transferring the chain between the first sprocket and the second sprocket; the chain transfer means comprising means for selectively imparting a displacement to the chain in either of a first direction and a second direction, the second direction being substantially opposite the first direction, the first and second directions being generally perpendicular to the plane of rotation of each of the first sprocket and the second sprocket; the first sprocket comprising a plurality of teeth; the second sprocket comprising a plurality of teeth; the plurality of teeth of the first sprocket and the second sprocket comprising the means for receiving a torsional force; means for facilitating transfer of the chain between the first sprocket and the second sprocket; the means for facilitating transfer comprising at least one of the following sets of features a) and b):

a) recess means disposed in at least one of the first sprocket and the second sprocket, the recess means having means for accommodating and supporting a portion of the chain during transfer of the chain between the first sprocket and the second sprocket and for guiding the chain, during transfer, between the first sprocket and the second sprocket; and the recess having a surface having a portion extending substantially at a right angle with respect to the planes of rotation of the first sprocket and the second sprocket; and b) channel means for accommodating the chain as the chain is being transferred between the first sprocket and the second sprocket;

the channel means being defined by the plurality of teeth of at least one of the first sprocket and the second sprocket;

the channel means being oriented at a skew with respect to the planes of rotation of the first sprocket and the second sprocket; and the plurality of teeth of at least one of the first sprocket and the second sprocket forming the channel means as a substantially straight path for permitting a substantially straight transfer of the chain, with respect to the planes of rotation of the first sprocket and the second sprocket, between the first sprocket and the second sprocket.

BRIEF DESCRIPTION OF THE DRAWINGS

Preferred embodiments of the invention are schematically illustrated in the accompanying drawings, wherein:

FIG. 2A shows a detail from FIG. 1A on a larger scale, during the transfer of the chain from a smaller sprocket to a larger sprocket;

FIG. 3A shows a sprocket as an isolated part with a tooth space and teeth with indentation;

FIG. 4 shows a view as in FIG. 2, but with a different correspondence between the inner and outer pair of link plates and the sprockets;

DESCRIPTION OF THE PREFERRED EMBODIMENTS

Figure 1:
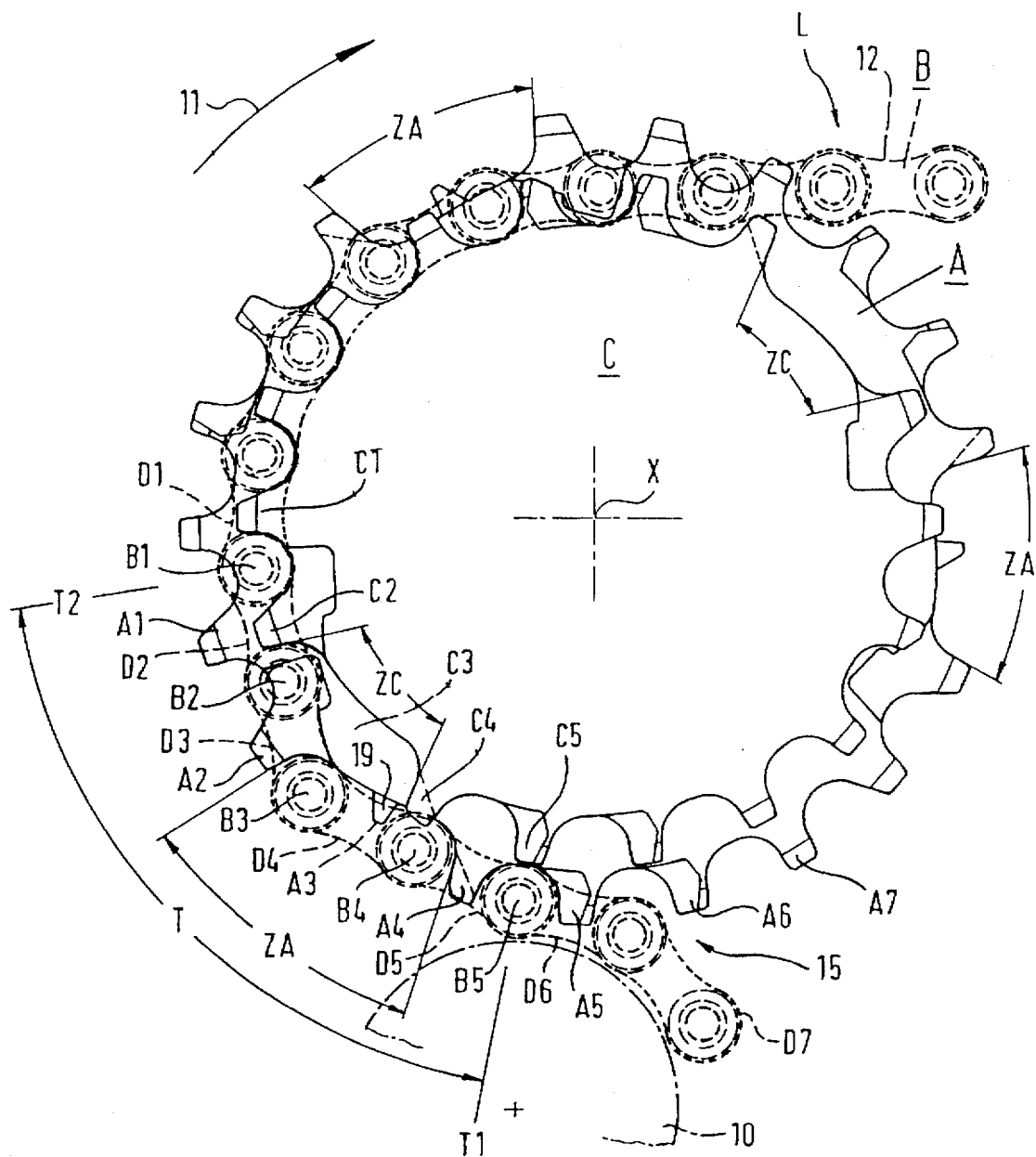
FIG. 1 represents a sprocket set on the rear wheel of a bicycle, with a chain and a chain shifting device.
Figure 1A:
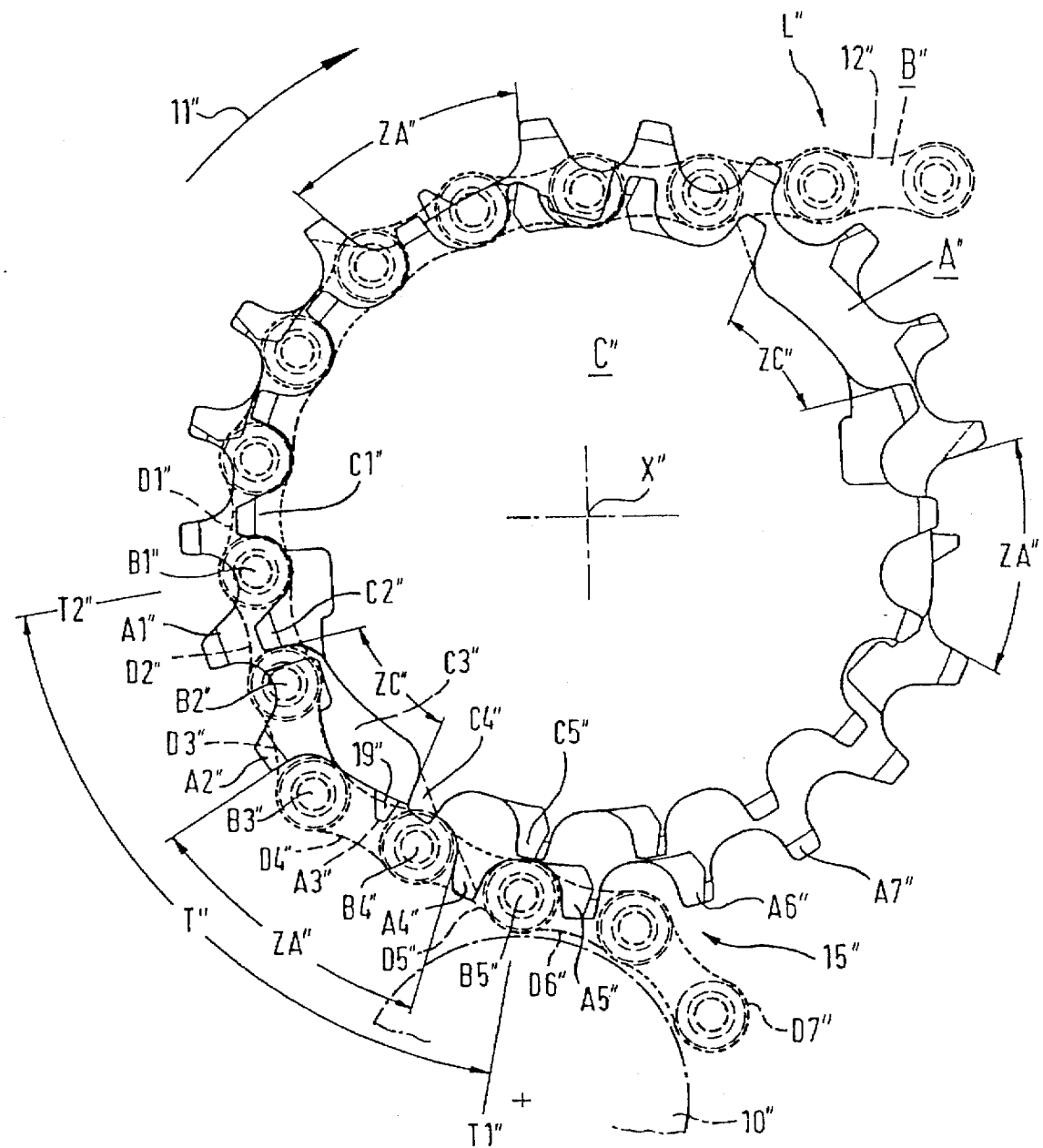
FIG. 1A shows a side view of a rear wheel hub sprocket set of a bicycle with chain and derailleur device.

FIG. 1A shows two sprockets which have a common axis of rotation X" of a rear wheel sprocket set of a bicycle, whereby the larger sprocket is designated A" and the smaller sprocket C". In the illustrated example, the large sprocket A" has 21 teeth and the smaller sprocket C" has 18 teeth. A chain which connects the rear wheel sprocket set to a crank and front sprocket set of the bicycle is designated B". The chain B" runs over the guide wheel 10" of a derailleur device into the sprocket set A", C". The normal direction of circulation of the chain B", corresponding to forward motion, is indicated by the arrow 11". 12" is the upper strand of the chain which runs tangential to the front sprocket set, and 15" is the entrance of the chain B" into the rear wheel sprocket set.

FIG. 1A represents the process of shifting from the smaller sprocket C" to the larger sprocket A". In the upper half of FIG. 1A, the chain B" is still engaged with the smaller sprocket C". In the lower half of FIG. 1A, a portion of the chain B" is already in contact with the larger sprocket A".

The transfer of the chain B" from the smaller sprocket C" to the larger sprocket A" has been initiated by a movement of the guide wheel 10" perpendicular to the plane of the drawing toward the rear, at a time prior to the situation illustrated in FIG. 1A, when the tooth A1" of the large sprocket A" was still in front of the vicinity of the guide wheel 10". Thus a transfer zone for the chain B" has been formed, which is designated T" in general, the trailing end of which is designated T1" and the leading end of which is designated T2". This transfer zone T" travels forward, as the sprocket set A", C" continues to rotate in the direction of rotation 11". When the trailing end T1" of the transfer zone T" arrives in the run-off area L' as illustrated in FIG. 1A, in which the chain B" runs free of the sprocket set, to return to the front crank and sprocket set, the shifting process from the smaller sprocket C" to the large sprocket A" is complete.

The shifting process from the small sprocket C" to the large sprocket A" can be explained by observing the transfer zone T", which is illustrated on an enlarged scale in FIG. 2A.

In FIG. 2A, which shows the transfer zone T" on an enlarged scale, there is a chain hinge point B1". This chain hinge point is formed in the conventional manner by a bolt 13" and a chain roller 14". The chain hinge point B1" is that chain hinge point which, before the initiation of the shifting movement of the guide wheel 10", is still fully engaged with the small sprocket C", namely in a tooth space between the teeth C1" and C2" of the small sprocket C". The chain hinge point B5", which is exactly like the chain hinge point B1", is the first chain hinge point which is fully engaged with the large sprocket A" after the initiation of the shifting movement by the guide wheel 10", and namely in the tooth space between the two teeth A4" and A5" of the large sprocket A". The large sprocket A" has space designated A3" for a missing tooth between the successive teeth A2" and A4".

The small sprocket C", between its teeth C2" and C4" also has a space C3" for a missing tooth. The two spaces A3" and C3" result in enlarged tooth spaces ZA" and ZC". These tooth spaces ZA" and ZC" facilitate the transfer of the chain B" from the small sprocket C" to the large sprocket A".

The chain roller 14" of the chain hinge point B1" is still fully engaged with two successive teeth C1" and C2" of the small sprocket C". The chain roller 14" of the hinge point B2" has already been lifted somewhat out of the enlarged tooth space ZC". Therefore, with respect to the tooth A2" perpendicular to the plane of the drawing in FIG. 2A, the chain hinge point B3" is therefore no longer engaged in a driving connection with the tooth A2". The tooth A4" is engaged between the two chain side plates of the outer chain side plate pair D5a", and the chain hinge point B5" is the first hinge point which is engaged with its chain roller 14" between two successive teeth A4" and A5" of the large sprocket A".

FIG. 2A shows that the hinge point B2" is elevated from the bottom ZC1" of the enlarged tooth space ZC"; in other words, the transfer chain segment B1"–B5", even with its forwardmost section B1", B2" in the direction of rotation does not enter the small sprocket C" tangentially, but at an acute angle to a tangent to the small sprocket C", which is laid through the hinge point B1".

Turning now to FIGS. 3A through 5A, it should be understood that components discussed herebelow with relation to FIGS. 3A through 5A may, if appropriate, be considered to be interchangeable with similar components discussed hereabove with relation to FIGS. 1A and 2A.

FIG. 3A shows an individual sprocket in which the tooth preceding the tooth space ZA'" is provided with an indentation, whereby the outward surface A7'" supports the chain inner side plates, and the diagonal surface A8'" guarantees the passage of the chain from the larger to the smaller sprocket.

The second tooth following the tooth space ZA'" is also preferably provided with an outer surface A7'" and a diagonal surface A8'" running perpendicular to it.

Figure 3:
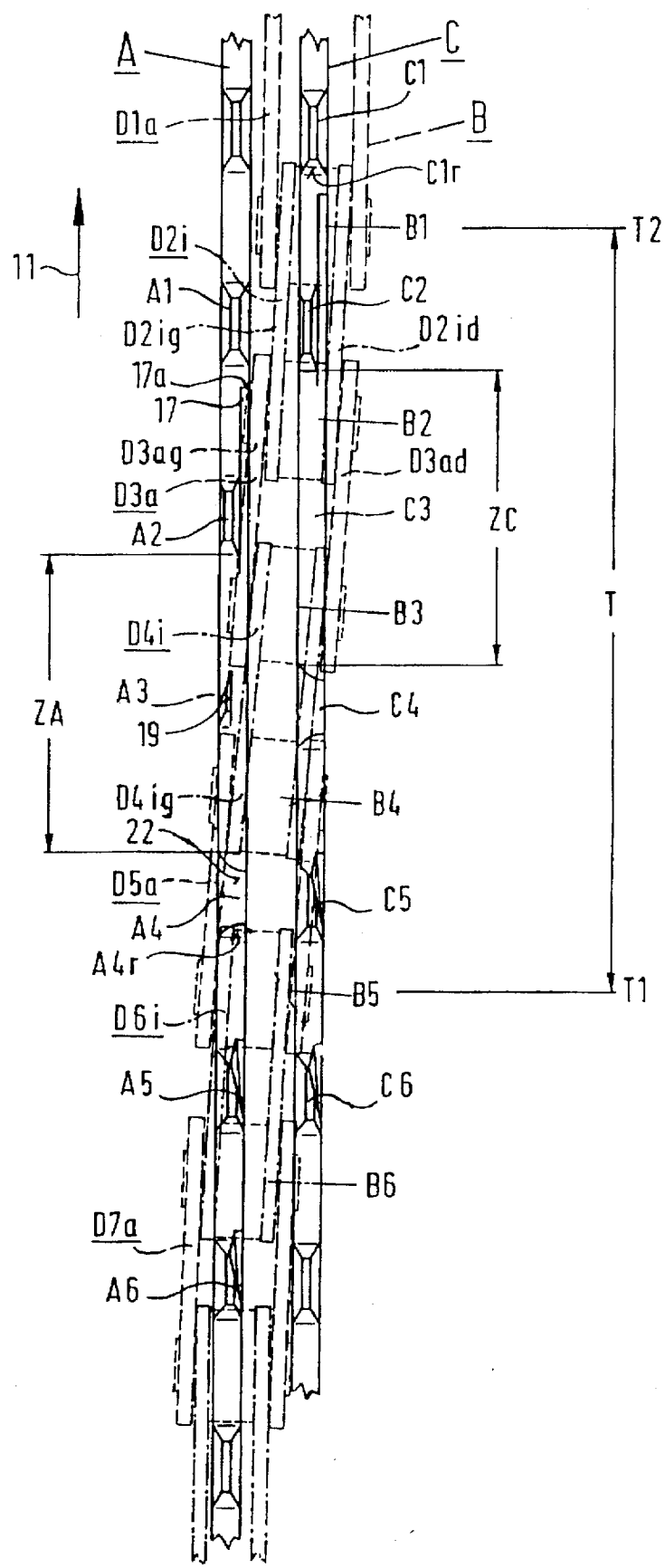
FIG. 3 shows a view of the chain transfer area illustrated in FIG. 2 from radially outside.
Figure 4A:
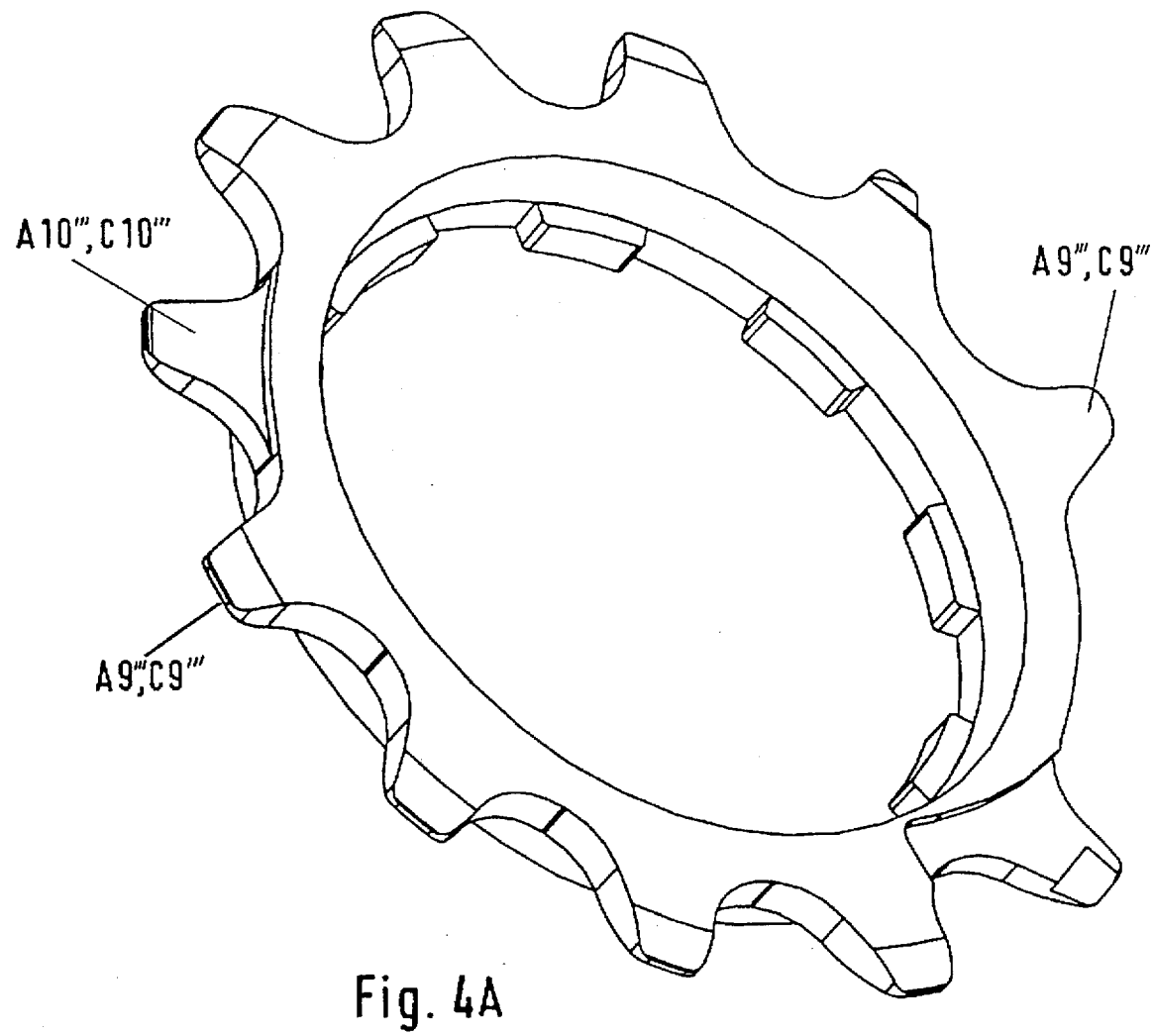
FIG. 4A shows an additional sprocket, viewed from the front, with a tooth which has a bevel.

FIG. 4A shows a sprocket from the front, whereby one of the teeth has a bevel on its rear side. This bevel on the rear side of the tooth A9'" is facing the neighboring larger sprocket, and together with a side plate support ramp 16'" (see FIG. 3A) on the larger sprocket forms a lane or path for the chain so that it can be shifted from the small sprocket to the large sprocket.

In contrast, the surface A7'" and the diagonal surface A8'" perpendicular to it, as shown in FIG. 3A, essentially assist the process of shifting from the larger sprocket to the smaller sprocket.

Figure 5:
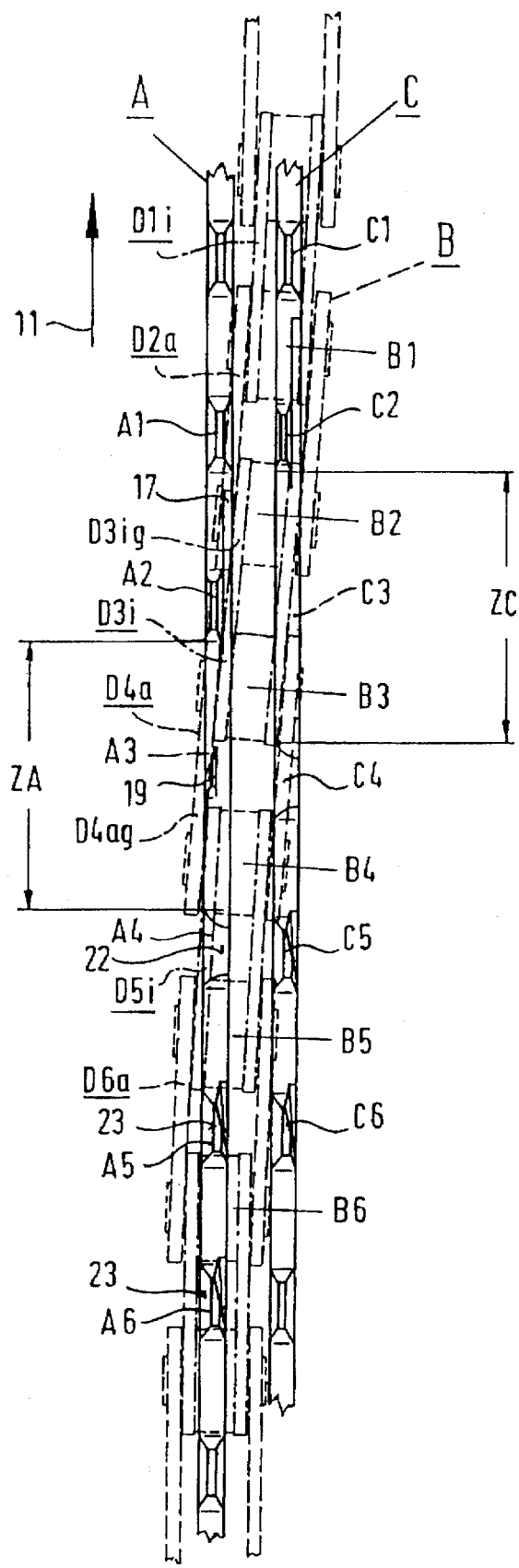
FIG. 5 shows a view of the chain transfer segment illustrated in FIG. 4 from radially outside.
Figure 5A:
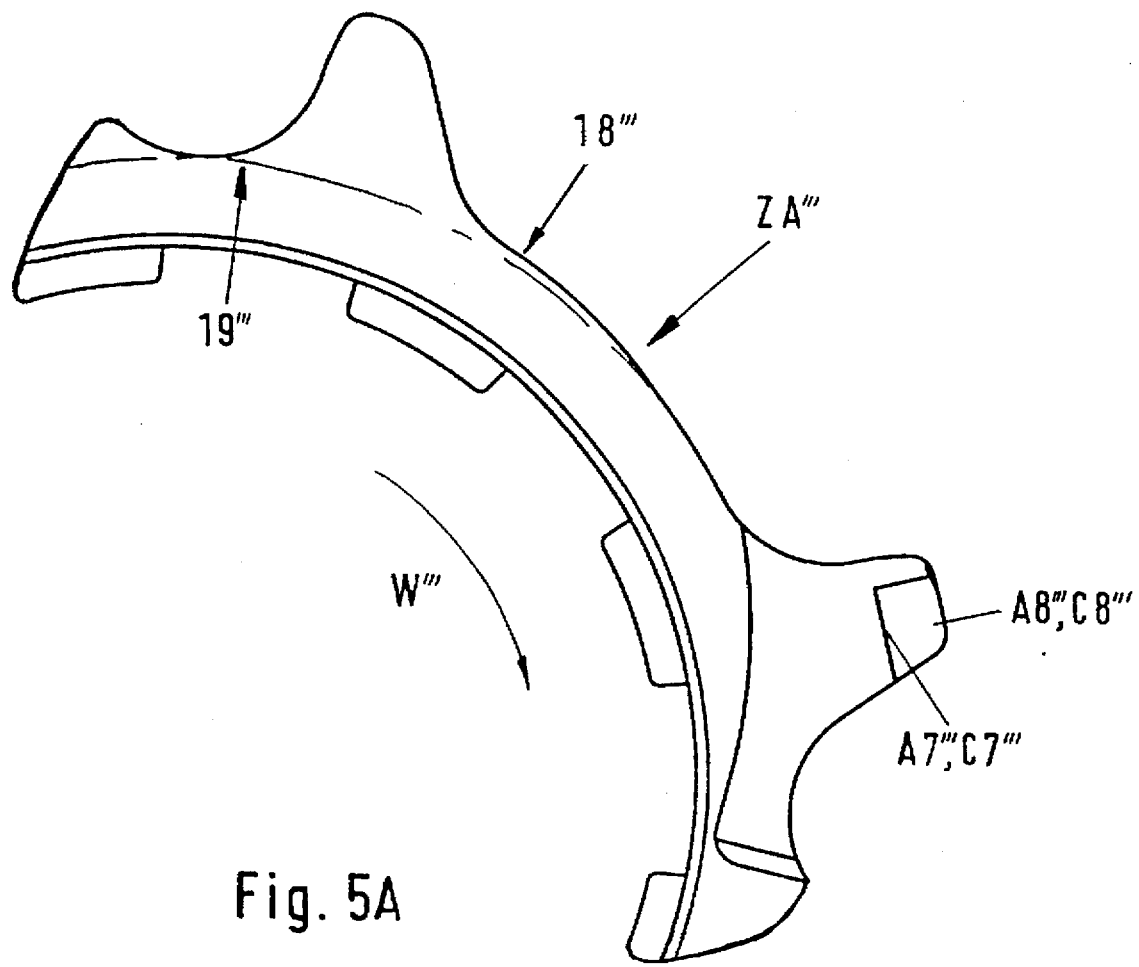
FIG. 5A shows a part of a sprocket with a tooth space and an elevation above the root circle diameter.

FIG. 5A shows a detail of a sprocket in which, in the tooth space ZA'", there can preferably be an elevation 18'" above the root circle diameter 19'". This root circle elevation 18'" essentially promotes a smooth run-off of the chain through the tooth space ZA'" by means of the chain length adjustment. The elevation 18'" is preferably sized so that the pivoting of the chain roller in and out is no longer different from the behavior of standard teeth.

Thus, in accordance with at least one preferred embodiment of the present invention, as shown in FIGS. 3A through 5A, the following teeth may preferably have a configuration such as that indicated at A7'", C7'" and A8'", C8'":

a tooth immediately preceding the double-tooth space ZA'", as viewed in the conventional direction of rotation of the sprocket set in question; and the second tooth following the tooth space ZA'", as viewed in the conventional direction of rotation of the sprocket arrangement in question.

The configuration in question may preferably include a surface A8'" or C8'" that faces generally in an axial direction of the sprocket arrangement, albeit at a slight skew with respect to the planes of rotation of the sprocket arrangement in question yet preferably having a strictly vertical orientation with respect to the planes of rotation of the sprocket arrangement in question. As shown most clearly in FIG. 3A, a surface A7'" facing generally radially outwardly with respect to the sprocket arrangement in question, may preferably be indented perpendicularly with respect to the planes of rotation of the sprocket arrangement in question and may preferably intersect surface A8'" in such a way, at one end, surface A7'" has a maximum width with respect to the axial direction of the sprocket arrangement in question and, at the other end, the surface A7'" tapers to a point. This tapering of surface A7'" will preferably be defined by the skewing of vertical surface A8'". Preferably, surface A8'" will facilitate passage of a chain from a larger sprocket to a smaller sprocket, while surface A7'" will preferably be capable of supporting an inner-side plate of a chain.

As shown in FIG. 4A, the tooth A9'", C9'" that immediately trails the double-tooth space ZA'" (see FIG. 3A) when viewed in the conventional direction of rotation of the sprocket arrangement in question, will preferably have, on its side facing the neighboring larger sprocket, a bevel that will preferably be suitably configured and dimensioned so as to facilitate shifting from the smaller sprocket in question to the larger sprocket in question.

Generally, the tooth A9'", C9'" may be bevelled in essentially any suitable manner that permits the behavior just described. Conceivably, this could involve providing that side of the tooth A9'", C9'" facing the neighboring larger sprocket with an essentially planar surface being oriented essentially parallel to the planes of rotation of the sprocket arrangement in question, that is itself indented into the basic structure of the tooth A9'", C9'" to a degree defined by an intersecting surface, such as a surface being perpendicular to the aforementioned indented surface. This will be best appreciated from FIG. 3A. Accordingly, the effective width of tooth A9'", C9'" will preferably be reduced along the radial extent of tooth A9'", C9'" except, preferably, at the base of the tooth A9'", C9'". Thus, in accordance with the preferred embodiment of the present invention, the overall width of tooth A9'", C9'", as defined at the outer radial sides of the tooth A9'", C9'", will preferably taper from a maximum width at the base of the tooth A9'", C9'" to a minimum width at the radially outermost portion of tooth A9'", C9'". The aforementioned maximum width of tooth A9'", C9'", at the base of the tooth A9'", C9'", will preferably be essentially the same as the base width of the majority of the remaining teeth on the sprocket in question. However, the aforementioned minimum width will preferably be considerably less than the aforementioned maximum width, with the result that tooth A9''', C9''' will preferably have a notably smaller width at its radially outermost portion than will have the majority of remaining teeth on the sprocket in question at their radially outermost portions.

Figure 6:
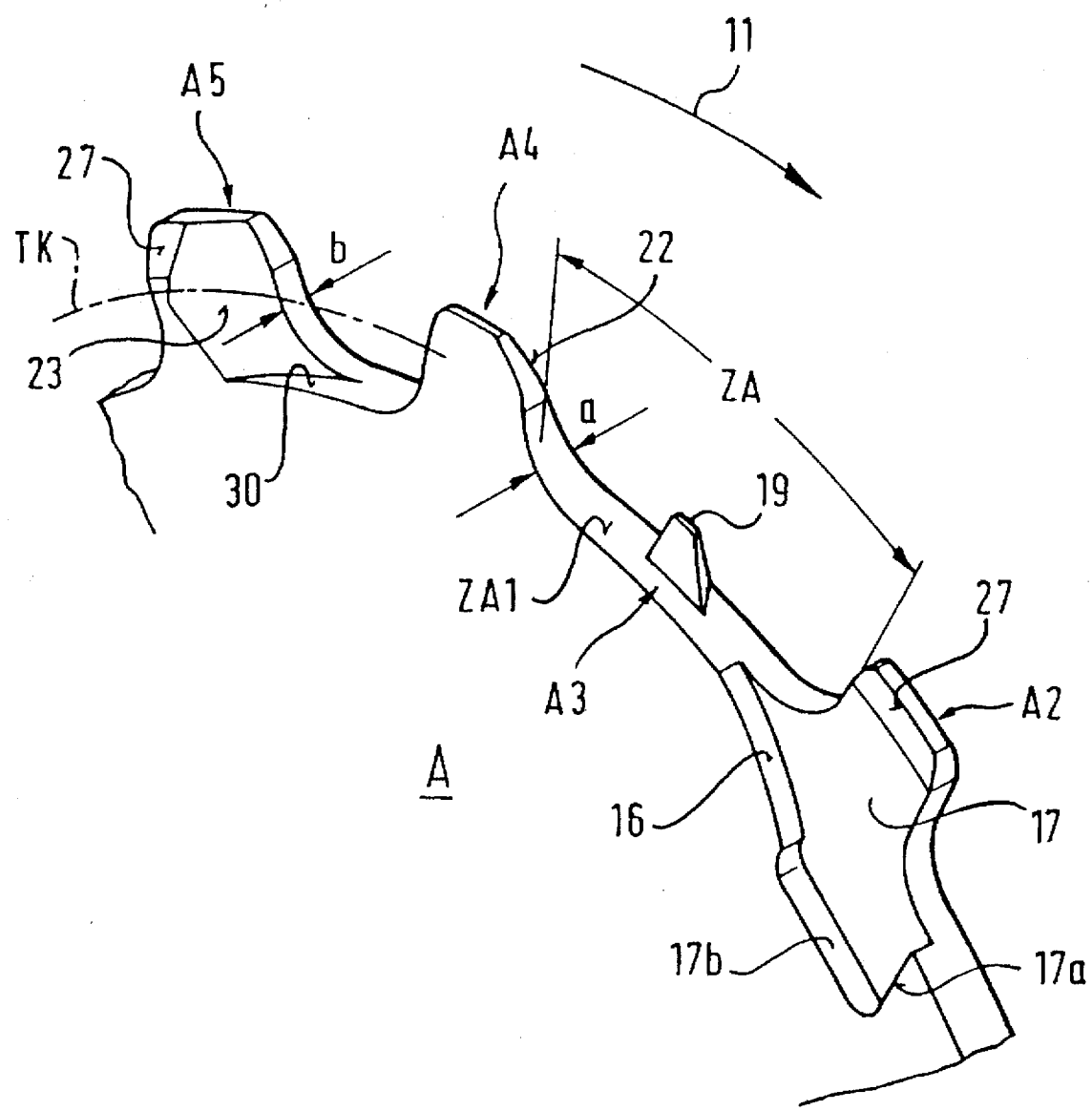
FIG. 6 shows a detail of the larger sprocket illustrated in FIGS. 1 to 5.

Alternatively, tooth A9''', C9''' may be bevelled in a manner similar to the tooth A4 that is discussed herebelow with relation to FIGS. 1–9 (see, for example, FIG. 6).

Also illustrated in FIG. 4A is a tooth A10''',C10'''. This tooth A10''',C10''' may preferably be disposed relative to other teeth in the manner shown in FIG. 4A, and may preferably have a physical configuration such as that shown in FIG. 4A. In a preferred embodiment of the present invention, tooth A10''',C10''' may be of a limited width such that it does not extend across the entire tooth-bearing portion of the sprocket in question in an axial direction of the sprocket. Another tooth A9''',C9''' may be disposed adjacent tooth A10''',C10''', in the manner shown in FIG. 4A.

As shown in FIG. 5A, in the double-tooth space ZA, there may preferably be a slight rise or elevation with respect to the constant root circle diameter 19'''. The elevation or rise 18''' will preferably be so dimensioned that a chain roller pivoting in and out of the double-tooth space ZA''', especially during transfer of a chain from a smaller sprocket to a larger sprocket, will mimic the behavior of a chain roller pivoting among standard teeth. An elevation or rise 18''' having relative dimensions, proportions and shapes as shown in FIG. 5A is believed to produce such results.

The disclosure now turns to another type of sprocket arrangement, as shown in FIGS. 1–12, having characteristics and features that may be employed in accordance with the embodiments of the present invention. It should be understood that components discussed herebelow with relation to FIGS. 1–12 may, if appropriate, be considered to be interchangeable with components discussed hereabove with relation to FIGS. 1A–5A.

The term "derailleur" may be considered to be interchangeable with the term "derailleur arrangement" herein, where appropriate.

FIG. 1 shows two sprockets with the common axis of rotation (X) of a set of sprockets on the rear wheel of a bicycle, whereby the larger sprocket is designated A and the smaller sprocket is designated C. In the illustrated example, the large sprocket A has 21 teeth and the small sprocket C has 18 teeth. A chain which connects the rear set of sprockets with a crankset chainwheel of the bicycle is designated B. The chain B runs over the guide wheel 10 of a derailleur in the set of sprockets A, C. The normal direction of chain circulation corresponding to forward motion is indicated by the arrow 11. "12" designates the upper strand of the chain running tangential to the crankset, and "15" designates the approach of the chain B into the rear wheel set of sprockets.

FIG. 1 illustrates a shifting process from the smaller sprocket C to the larger sprocket A. In the upper half of FIG. 1, the chain B is still engaged with the smaller sprocket C. In the lower half of FIG. 1, a portion of the chain B is already in contact with the larger sprocket A.

The transfer of the chain B from the small sprocket C to the large sprocket A has been initiated by a motion of the guide wheel 10 perpendicular to the plane of the drawing at a time prior to the time pictured in FIG. 1, at which time the tooth A1 of the large sprocket A was still ahead of the area of the guide wheel 10. In other words, in accordance with at least one preferred embodiment of the present invention, the transfer of the chain B from the small sprocket C to the large sprocket A has been initiated by a motion of the guide wheel 10 perpendicular to the plane of the drawing at a time prior to the time pictured in FIG. 1, at which prior time the tooth A1 of the large sprocket A had not yet arrived in the vicinity of guide wheel 10.

A transfer zone of the chain has thereby been formed, which zone is designated overall by T, the trailing end of which zone T is designated T1 and the leading end of which zone T is designated T2. As the set of sprockets A,C continues to rotate, this transfer zone continues to travel in the direction of rotation 11. When the trailing end T1 of the transfer zone T reaches the runout area L as illustrated in FIG. 1, in which runout area L the chain B is preferably released from the set of sprockets, whence the chain B proceeds toward the set of sprockets on the front crankset, and the action of shifting from the small sprocket C to the large sprocket A is essentially completed.

Thus, in accordance with at least one preferred embodiment of the present invention, it will be appreciated that the arrangement illustrated in FIG. 1 could preferably relate to a rear set of sprockets in a bicycle such that, after chain B passes through runout area L, it will preferably proceed to a front crankset.

Figure 2:
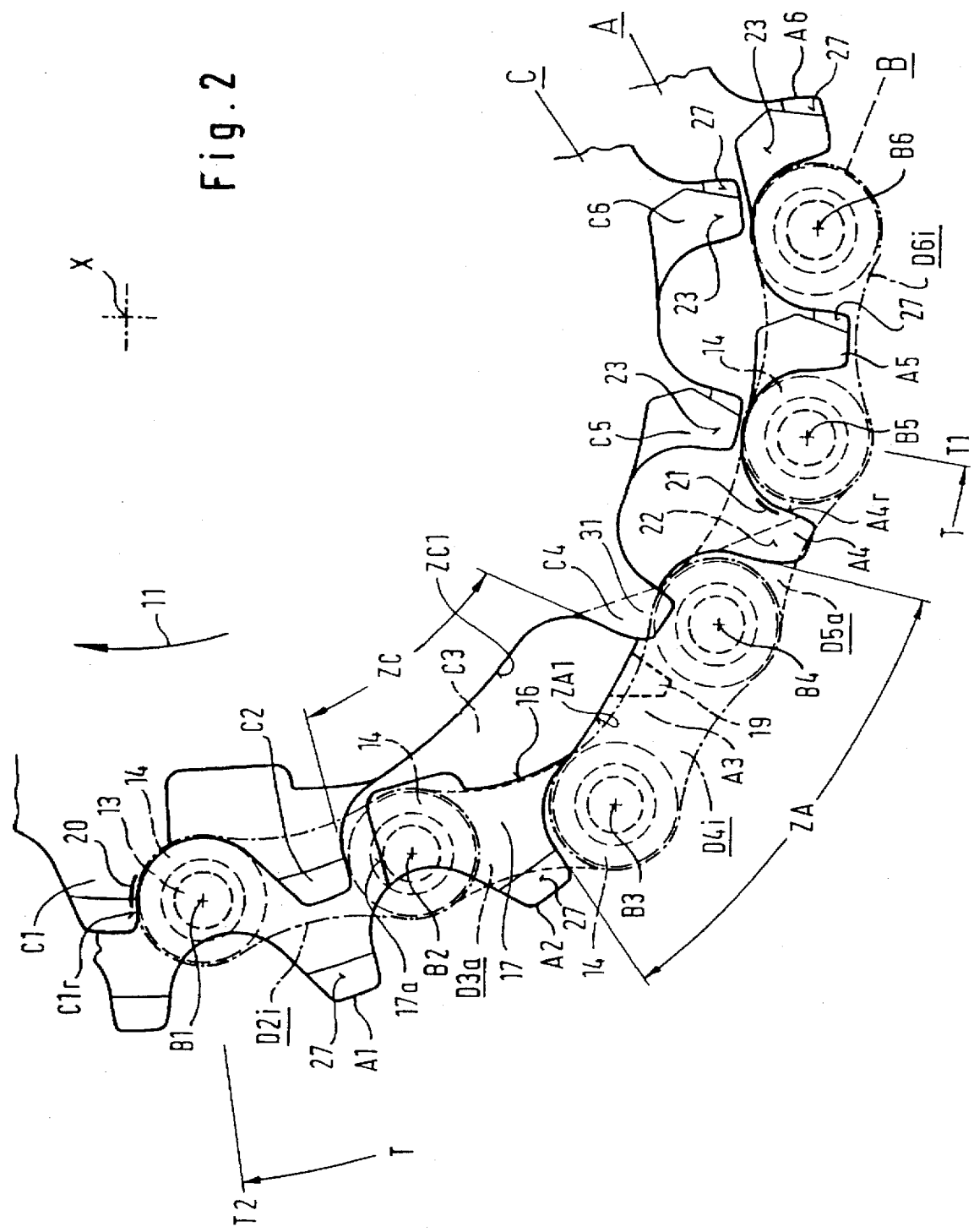
FIG. 2 shows a section of FIG. 1 on an enlarged scale, during the transfer of the chain from a smaller sprocket to a larger sprocket.

The action of shifting from the small sprocket C to the large sprocket A can be explained by considering the transfer zone T, which is illustrated on an enlarged scale in FIG. 2.

In FIG. 2, which illustrates the transfer region T on an enlarged scale, there is a chain hinge point B1. This chain hinge point B1 is preferably formed in the conventional manner by a pin 13 and a chain roller 14. The chain hinge point B1 can be thought of as that chain hinge point which, before the initiation of the shifting motion of the guide wheel 10, is still essentially in full engagement with the small sprocket C, and is engaged in a tooth space between the teeth C1 and C2 of the small sprocket C. The chain hinge point B5, which is preferably designed essentially in exactly the same manner as the chain hinge point B1, can be thought of as the first chain hinge point which, after the initiation of the shifting motion of the guide wheel 10, comes essentially into full engagement with the large sprocket A, namely in the space between the two teeth A4 and A5 of the large sprocket A. The large sprocket A, between the successive teeth A2 and A4, preferably has a space where a tooth is missing, which space is designated A3. In this missing tooth space A3, there can preferably be a spur, which is indicated at A3 in broken lines; this spur will be explained in greater detail below.

The small sprocket c, between its teeth C2 and C4, also preferably has a space C3 where a tooth is missing. Thus, the two spaces A3 and C3 can essentially preferably result in larger spaces ZA and ZC between teeth. These tooth spaces ZA and ZC preferably facilitate the transfer of the chain B from the small sprocket C to the large sprocket A. This is illustrated in FIG. 3, which also shows the transfer zone T and the tooth spaces ZC and ZA.

The following information regarding the design of the chain B should also be noted, to make the rest of the explanation easier to understand:

Chain B, between successive chain hinge points, e.g. between the chain hinge points B1 and B2, preferably has an inner pair D2$i$ of link plates. The left-hand link plate of a pair of link plates in FIG. 3 is designated with the index g; this is the link plate which can be thought of as being toward the larger sprockets of a set of sprockets, while the right-hand link plate is designated by the index d. Accordingly, the pair D2$i$ of link plates preferably includes the link plates D2$ig$ and D2$id$, and the outer pair D3$a$ of link plates preferably includes the two link plates D3$ag$ and D3$ad$. Between the other chain hinge points B3 and B6, there preferably follow, in succession, an inner pair D4*i* of link plates, an outer pair D5*a* of link plates, another inner pair D6*i* of link plates, etc.

It will be understood, in accordance with at least one preferred embodiment of the present invention, that "outer" pairs of link plates preferably alternate with "inner" pairs of link plates, such that there is essentially a wider gap between link plates of an "outer" pair of link plates than between link plates of an "inner" pair of link plates.

The chain roller 14 of the chain hinge point B1 is shown as being still in essentially full engagement with two successive teeth C1 and C2 of the small sprocket C. As shown, the chain roller 14 of the chain hinge point B2 has already been lifted somewhat out of the enlarged tooth space ZC. The next chain hinge point B3 is shown as being not in driving engagement with the tooth A2, but the left link plate D3*ag* of the outer pair D3*a* of link plates in FIG. 3 is shown as being to the right of the tooth A2, whereby the radial height of the chain hinge point B3 is essentially determined by the fact that the left link plate D3*ag* of the pair D3*a* of link plates is shown as lying on a base plate 16 of the large sprocket A, which base plate 16 preferably borders a relief-type recess 17 in the front side, facing the observer in FIG. 2 and on the front right side in FIG. 3.

Thus, in accordance with a preferred embodiment of the present invention, in the arrangement shown in FIGS. 2 and 3, the left link plate D3*ag* of the pair of link plates D3*a* preferably lies on an area, base plate 16, which may be considered to be a ramp or lower portion of a recess 17. As shown, a lower portion of left link plate D3*ag* may preferably at least partially lie on the base plate 16. In accordance with at least one preferred embodiment of the present invention, the recess 17 and the base plate 16 may preferably be so arranged and dimensioned such that an essentially smooth and optimal positional transition of link plate D3*ag* takes place between the sprockets C and A. It will be appreciated, in accordance with at least one preferred embodiment of the present invention, that corner 17*a* of recess 17 may preferably act as a fulcrum and thereby have positioned thereagainst a portion of link plate D3*ag*, to assist in the aforementioned transition.

The chain hinge point B3 is therefore shown as being offset in relation to the tooth A2 perpendicular to the plane of the drawing in FIG. 2, and to the right in FIG. 3, and is shown as essentially not being in e driving engagement with the tooth A2, as shown in particular in FIG. 3. The tooth A4 is shown as being engaged between the two link plates of the outer pair D5*a* of link plates. The chain hinge point B5 shown as being the first hinge point which is engaged with its chain roller 14 between two successive teeth A4 and A5 of the large sprocket A.

FIG. 2 shows that the hinge point B2 is raised from the bottom ZC1 of the enlarged tooth space ZC; that essentially means that the transfer chain segment B1–B5, even with its forwardmost section B1, B2, essentially, in accordance with at least one preferred embodiment of the present invention, does not approach the small sprocket C tangentially, but at an acute angle to a tangent to the small sprocket C, which tangent can be thought of as being laid, or defined, by the hinge point B1.

FIG. 3 shows that the enlarged tooth spaces ZC and ZA can, in accordance with at least one preferred embodiment of the present invention, preferably form a "chain channel", and facilitate the transfer of the chain B from the hinge point B1 engaged with the small sprocket C to the hinge point B5 engaged with the large sprocket A. When the chain transfer is initiated from the small sprocket C to the large sprocket A, the left link plate D3*ag* of the outer pair D3*a* of link plates—to the rear in FIG. 2 and to the left in FIG. 3—is preferably pushed toward a relief-like recess 17, so that the radially inner edge of this rear link plate D3*ag* is preferably in contact with the ramp, or base plate, 16 which is adjacent radially inward to the relief-like recess 17 during the further rotation of the set of sprockets. It should thereby be noted that the rear link plate D3*ag* of the outer pair D3*a* of link plates essentially, in accordance with at least one preferred embodiment of the present invention, does not fall completely into the recess 17, but is tipped around its rear end corner 17*a*.

The transfer of the chain B from the small sprocket C to the large sprocket A, as mentioned above, is preferably initiated by a motion of the guide wheel 10 perpendicular to the plane of the drawing in FIG. 1 and, with relation to FIG. 3, by a movement of the guide wheel 10 from right to left. As a result of this movement of the guide wheel 10 from right to left (with relation to FIG. 3), preparations are essentially made for the transfer of the chain B. But the chain B essentially cannot be transferred to the large sprocket A until the chain B is essentially in lateral contact against the teeth A1 and A2. Essentially, it is only when, during the further rotation of the set of sprockets in the direction of the arrow 11, the link plate D3*ag* of the outer pair D3*a* of link plates approaching the entry area 15 (see FIG. 1) has been lifted radially outward by the ramp 16, and the inner pair D4*i* of chain links coincides with the enlarged tooth space ZA, that the transfer to the large sprocket can take place, during which transfer the tooth A4 of the large sprocket A is engaged between the link plates of the outer pair D5*a* of link plates.

It should also be noted that even if, in accordance with at least one preferred embodiment of the present invention, there is a spur 19 in the missing tooth space A3, this spur 19 will preferably at no time essentially act as an actual tooth. In other words, spur 19 is preferably configured such that at no point will it be effective for the transmission of torque from the chain B to the large sprocket A.

As shown, preferably, in accordance with a preferred embodiment of the present invention, spur 19 may preferably have the general appearance of a considerably scaled-down tooth. Preferably, spur 19 may be scaled down to such an extent as to be incapable of transmitting torque but capable of serving as a lateral guide or stop when the chain B is being shifted between sprockets.

Preferably, as long as the transfer area T of the chain B travels from the approach point 15 to the runout area L, the chain roller 14 of the chain hinge point B5 is preferably opposite the trailing flank A4*r* of the tooth A4, as viewed in the direction of arrow 11, to transmit torque at area 21 (see FIG. 2). On the other hand, the chain roller 14 of the chain hinge point B1 is preferably opposite the trailing flank C1*r* of the tooth C1, as viewed in the direction of arrow 11, to transmit torque at area 20 (see FIG. 2). When, during the further rotation of the set of sprockets A, C, the torque transmission point 20 between the hinge point B1 and the trailing flank of the tooth C1 enters the runout area L, the chain roller 14 of hinge point B1 is preferably raised from its engagement between the two teeth C1 and C2, the torque transmission at the point 20 is preferably eliminated and there is thence preferably a transmission of torque at the point 21 between the chain hinge point B5 and the trailing flank A4*r*, whereby the trailing end of the left link plate D3*ag* in FIG. 3 of the outer pair D3*a* of link plates is preferably supported in the direction of arrow 11 on the trailing end of the ramp 16 and/or on the base ZA1 of the enlarged tooth space ZA as before. As shown in FIGS. 2 and 3, the left link plate D4*ig* shown in FIG. 3 of the inner link plate pair D4*i* is preferably to the right of the spur 19, if there is such a spur.

The description of FIGS. 2 and 3 assumes, in accordance with at least one preferred embodiment of the present invention, that an inner link plate pair D4*i* preferably coincides with the area of the enlarged tooth space ZA.

The case in which an outer link plate pair D4*a* coincides with the area of the enlarged tooth space ZA is illustrated in FIGS. 4 and 5.

FIG. 5 shows that the spur 19, if any, which is present approximately at the location A3 of the missing tooth is now preferably engaged between the two link plates of the outer link plate pair D4*a*, which is essentially possible because there is no tooth at the location A3, but only the spur 19, which does not have any torque transmission function. Preferably, in accordance with at least one preferred embodiment of the present invention, spur 19 has, at most, a lateral chain guide function during reverse travel, so that this spur can be designed small enough, without the risk of an overload in the longitudinal and transverse direction of the chain, so that it can lie on one hand, as shown in FIG. 3, outside the chain and on the other hand, as shown in FIG. 5, inside the chain.

If there were a tooth at the location A3, then it would likely not be possible, on one hand, as shown in FIG. 3, for the left inner link plate D4*ig* of the inner link plate pair D4*i* to travel through the area ZA on the right side of the spur 19, and on the other hand, as shown in FIG. 5, for the left link plate D4*ag* of the outer link plate pair D4*a* to travel through the area ZA on the left side of the spur 19, so that in both cases, the subsequent tooth A4 can enter between the two link plates of the outer link plate pair D5*a* (FIG. 3) or of the inner link plate pair D5*i* (FIG. 5).

Also in the configuration illustrated in FIGS. 4 and 5, the spur 19—if any—is, in accordance with at least one preferred embodiment of the present invention, essentially never active as a tooth which interacts with the chain rollers 14 of the neighboring hinge points.

FIGS. 4 and 5 also show that, in contrast to FIGS. 2 and 3, the ramp 16 preferably corresponds to the link plate D3*ig* of the inner link plate pair D3*i*. The support of the chain hinge point B3 therefore essentially preferably results from the fact that the forward end of the left link plate D4*ag* of the outer link plate pair D4*a* illustrated in FIG. 5 is preferably supported on the base ZA1 of the extended tooth space ZA.

It is a particular advantage, as illustrated in FIG. 2 on one hand and in FIG. 4 on the other hand, that the same tooth A4 is preferably engaged, respectively, between the link plates of the outer link plate pair D5*a* and of the inner link plate pair D5*i*.

The tooth A4 of the large sprocket A which, during the transfer of the chain from the small sprocket C to the large sprocket A, preferably enters as the first tooth between the link plates of a link plate pair D5*a* and D5*i* respectively, can preferably be provided with a bevel 22 (FIGS. 3, 5 and 6). The bevel 22 thus can preferably result in a thinning of the tooth A4. If, independent of the correspondence of an inner link plate pair or of an outer link plate pair to the tooth space ZA, the same tooth A4 shown in FIGS. 3 and 5 will always essentially be the first one to enter between the link plates of the corresponding link plate pair D5*a* and D5*i*, then only one tooth, in this case tooth A4, is provided with the bevel 22 and therefore needs to be made thinner. With regard to the description of the process of transferring the chain B from the larger sprocket A to the smaller sprocket C, it should be noted that in this manner it becomes possible to apply other bevels to the teeth A5 and A6 as illustrated in FIGS. 2 and 4, which may be desirable with regard to the action of shifting from the larger sprocket A to the smaller sprocket C. If a bevel were also to be applied to the tooth A5, corresponding to the bevel 22 on the tooth A4, the simultaneous application of a bevel 23 (as shown) could lead to an excessive thinning of the tooth A5, which could lead to the breaking or premature wear of the tooth A5 which is active in transmitting the torque.

When the chain transfer from the small sprocket C to the large sprocket A as illustrated in FIGS. 4 and 5 is initiated, the left link plate D4*ag* of the outer link plate pair D4*a* illustrated in FIG. 5 is preferably pushed into the enlarged tooth space ZA. As the rotation proceeds in the direction indicated by the arrow 11, the positions of the inner link plate pair D3*i* and of the outer link plate pair D4*a* illustrated in FIGS. 4 and 5 preferably result, whereby the spur 19, if any, enters between the two link plates of the outer link plate pair D4*a*. If, during this process, the left link plate D3*ig* of the inner link plate pair D3*i* finds no support or insufficient support on the ramp 16, then this support can essentially preferably be replaced by the contact of the left link plate D4*ag* on the base ZA1 of the enlarged tooth space ZA.

The transfer from torque transmission between the chain B and the small sprocket C to torque transmission between the chain B and the large sprocket A on the other hand occurs as described for the situation illustrated in FIGS. 2 and 3.

Details of the large sprocket A in the vicinity of the enlarged tooth space ZA are illustrated in FIG. 6. Special note should be taken of the configuration of the relief-like recess 17 with the ramp 16, the edge 17*a* and the radially inward expansion 17*b*, as well as the configuration of the specified bevels 22 and 23. The figure also shows the base of the enlarged tooth space ZA which is designated ZA1.

The teeth A1, A2 and A5 are preferably provided with bevels 27. Upon the initiation of the shifting action from the small sprocket C to the large sprocket A, the guide wheel 10 and accordingly also the chain B are pushed toward the large sprocket A. These bevels 27 are preferably provided so that, in spite of this approach, the chain essentially cannot wind onto the tips of the teeth of the large sprocket. Although after the entry into the sprocket set, during the further rotation of the sprocket set, the chain B preferably moves radially inwardly in relation to the axis of the sprocket set, it preferably does not come into contact with the tooth tips, but instead with the bevels 27 and then preferably slides back over the bevels 27 toward engagement with the small sprocket C. Essentially, only when, during the continued rotation of the sprocket set in the direction of the arrow 11, the chain is axially opposite the relief-like recess 17 and the enlarged tooth space ZA, is the engagement with the small sprocket C preferably released, can the chain thence move under the action of the axial motion of the guide wheel in the direction away from the small sprocket C.

There is preferably no bevel 27 on the tooth A4. This tooth A4 preferably has the bevel 22 on its side away from the small sprocket, so that the tooth A4, regardless of whether it is radially flush with the outer link plate D5*a* shown in FIG. 3, or with the inner link plate D5*i* shown in FIG. 5, can be threaded between the corresponding link plates.

FIGS. 3 and 5 show that essentially none of the teeth participating in the chain transfer can exert an action which would push apart and burst a pair of link plates. This is true in particular where teeth are engaged in the inner link plate pair, i.e. in the narrow space between two inner link plates, and therefore where, in similar known systems, there was often the risk of a separation of the outer link plates from the chain rollers.

Figure 7:
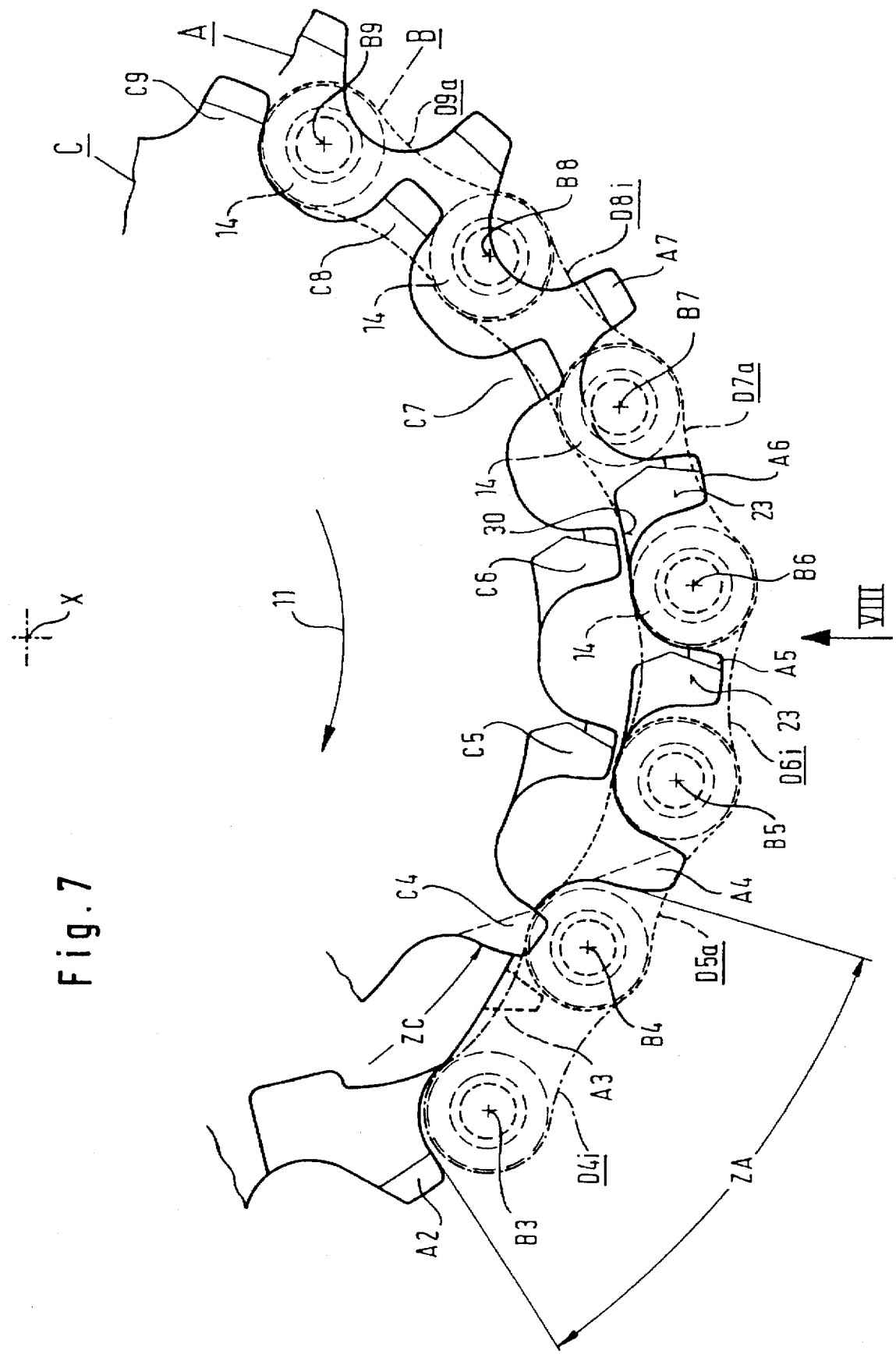
FIG. 7 shows a side view of a set of sprockets with a chain transfer segment which is formed during the shifting from the larger sprocket to the smaller sprocket.
Figure 8:
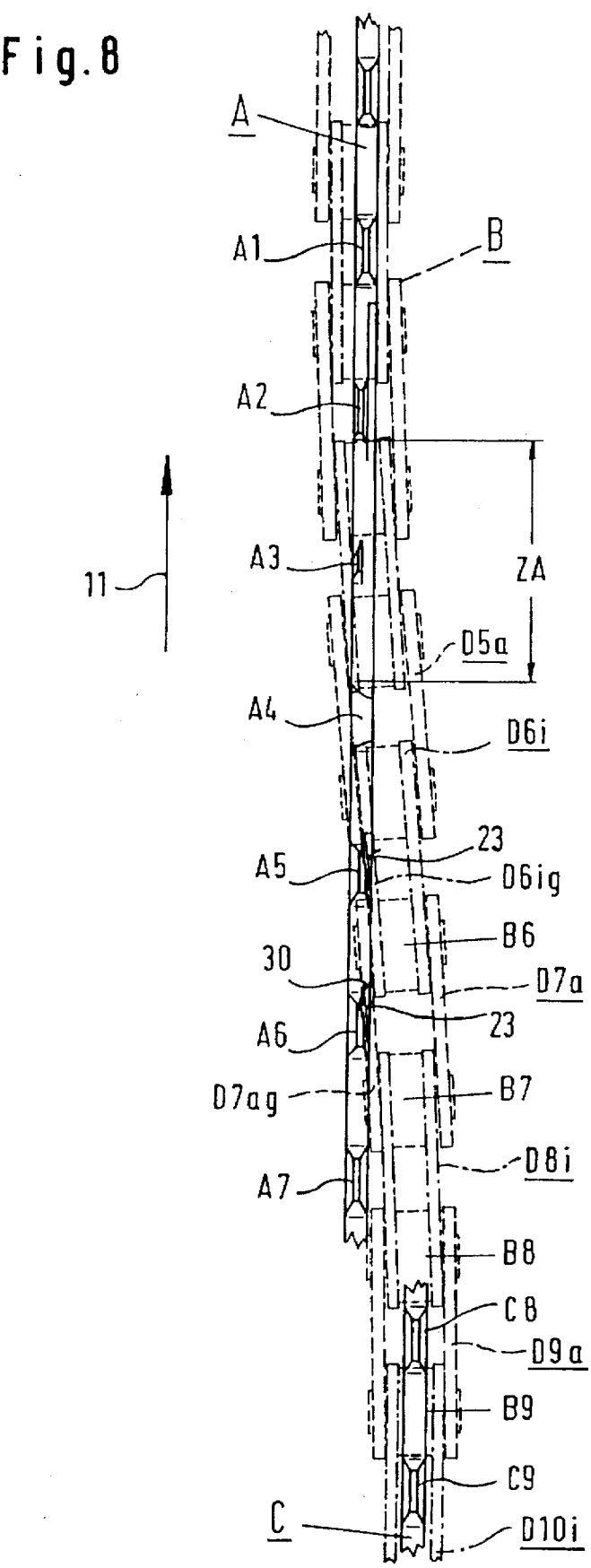
FIG. 8 shows a view in the direction of Arrow VIII in FIG. 7.

The shifting from the large sprocket A to the smaller sprocket C is illustrated in detail in FIGS. 7 and 8. For the consideration of the shifting action, FIG. 7 shows the relevant area between the tooth A2 of the large sprocket and the tooth C9 of the small sprocket.

For purposes of illustration with respect to FIG. 1 of the situation illustrated in FIG. 7, the tooth C9 is placed behind the position T1 of FIG. 1, in the direction of circulation 11, while the tooth A2 has been placed ahead of the runout area L, in the direction of circulation 11.

In FIGS. 6, 7 and 8, bevels 23 have been applied to the teeth A5 and A6, for which reference is made to FIG. 6 in particular. The teeth A5 and A6 are those teeth which, during rotation opposite to the normal direction of circulation 11, are respectively the first tooth A5 and the second tooth A6 to follow that tooth A4 which, during the shifting described above from the small sprocket C to the large sprocket A, was the first tooth engaged between the link plates of a link plate pair. In other words, the tooth A5 with the bevel 23 is that tooth which, opposite the direction of circulation 11, is the second tooth following the space A3 for the missing tooth, and the tooth A6 with the bevel 23 is the teeth which is the third tooth following the space A3 for the missing tooth.

Basically, the action of shifting from the large sprocket A to the small sprocket C can be thought of as being less critical than the action of shifting from the small sprocket C to the large sprocket A. This would appear to be true first because it is essentially easier to shift the chain B under tension from a large sprocket A to a small sprocket C, which is supported by the chain tension. An additional reason is that the transfer from a large sprocket to a small sprocket is made when the rider wants to shift from a lower gear to a higher gear; then, as a rule, there is a circumferential velocity which is significantly more favorable for the shifting action, and on the other hand there is also a lower torque, which is also favorable for the shifting action. Nevertheless, it is generally desirable to make the shift from the larger sprocket A to the smaller sprocket C as quickly, smoothly and quietly as possible. For this purpose, there are preferably bevels 23 on the teeth A5 and A6, whereby with regard to the tooth A5 in particular, reference is made to FIG. 6. The bevels 23, as shown in particular in FIG. 6 and FIG. 8, are preferably inclined along a circumferential line TK (FIG. 6) in relation to a plane orthogonal to the axis of the sprocket set, so that in the direction of rotation 11 along the circumferential line TK, the bevel 23 is preferably at an increasing axial distance from the neighboring smaller sprocket C. This is also shown by a comparison of the tooth thicknesses b and a in the vicinity of the respective leading flank of the teeth A5 and A4, where b is preferably less than a.

If the rider wants to shift from the larger sprocket A to the smaller sprocket C as shown in FIG. 1, the guide wheel 10 is again essentially moved orthogonally to the plane of the drawing in FIG. 1, but this time toward the observer, i.e. to the right in FIG. 8. In other words, an attempt is made to push the chain B in the axial direction of the sprocket set toward the next smaller sprocket C. The transfer of the chain B is facilitated if the tooth A5 or the tooth A6 is preferably in the approach area 15 (See FIG. 1). As shown in FIG. 8, for example, the left link plate D6*ig* of the inner link plate pair D6*i* shown in FIG. 8 in the vicinity of the tooth A5 can then reach the bevelled surface 23 facing the smaller sprocket C. Then the link plate pairs D7*a*, D8*i* and D9*a* following the inner link plate pair D6*i*, as they enter the position 15, can essentially no longer become engaged with the teeth of the large sprocket A following the tooth A6. The chain B is lowered to the outside circumference of the small sprocket C radially inwardly in relation to the axis of the sprocket set. The hinge points B6, B7 and B8 cannot yet be engaged with their chain rollers 14 between the successive teeth of the small sprocket, as shown in FIG. 7 by the representation of the circumferential offset. A radially inward motion of the hinge point B6 is prevented because the link plate D7*ag* to the left in FIG. 8 of the outer link plate pair D7*a* is supported against the shoulder 30 (See FIG. 6), which is formed as a result of the bevel 23, and on the other hand the chain rollers 14 of the hinge points B7 and B8 can lean against the teeth C7 and C8. On the other hand, the hinge point B9 can be engaged between the successive teeth C8 and C9. The existence of the elongated tooth space ZA, together with the bevels 23 on the teeth A5 and A6, essentially promotes the diagonal position of the chain B when the guide wheel 10 moves toward the smaller sprocket, as shown in FIG. 8. The enlarged tooth space ZC, shown in FIG. 7, can also contribute to facilitating the transfer of the chain B between the large sprocket A and the small sprocket C.

Figure 9:
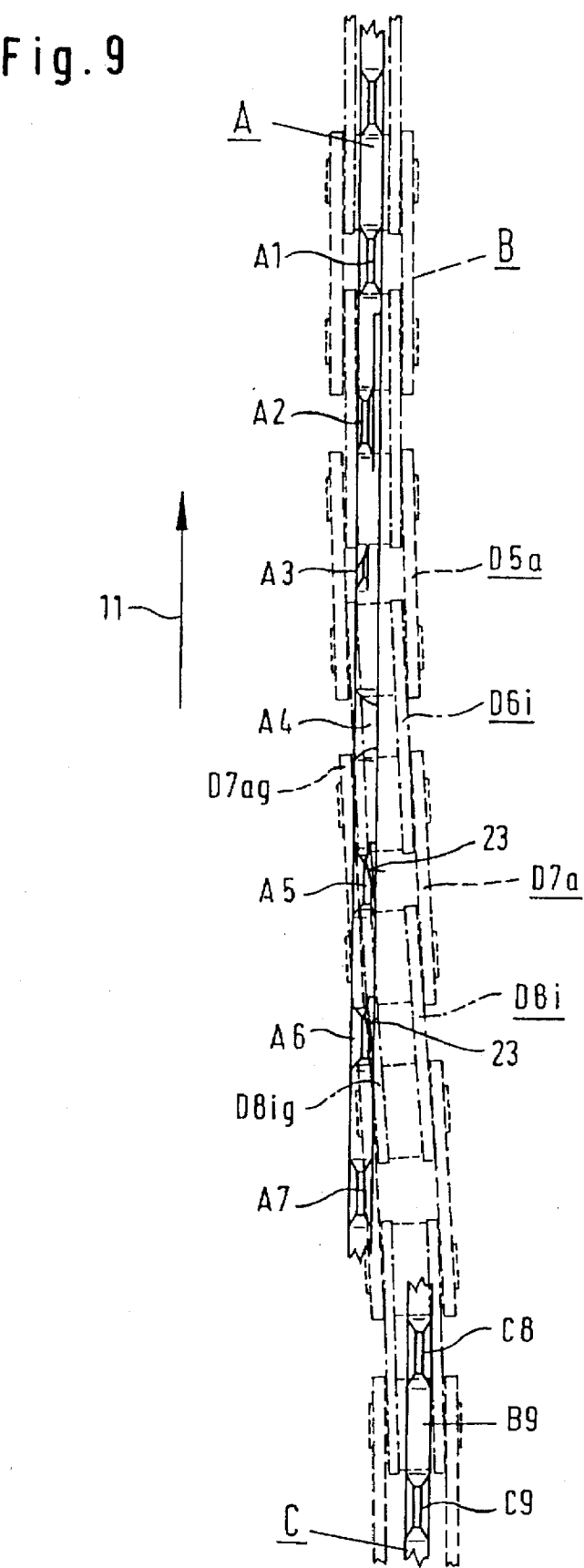
FIG. 9 shows a view as in FIG. 8, but with a different correspondence between the outer and inner chain links and the sprockets.

FIG. 9 illustrates the situation which occurs during a shifting of the chain B from the large sprocket A to the small sprocket C, an outer link plate pair D5*a* is located in the vicinity of the missing tooth space A3 and accordingly an inner chain link pair D6*i* is located in the vicinity of the tooth A4, and an outer chain link pair D7*a* is located in the vicinity of the tooth A5. Then, as shown in FIG. 1, at the approach position 15, the chain B, on account of its limited flexibility, essentially cannot be bent far enough out of its principal plane so that the left link plate D7*ag* in FIG. 9 of the outer link plate pair D7*a* can move to the right of the tooth A5; rather, the left link plate D7*ag* of the outer link plate pair D7*a* in FIG. 9 will pass on the left side of the tooth A5. Essentially, only the left link plate D8*ig* of the inner link plate pair D8*i* corresponding to the tooth A6 can then move past on the right side of the tooth A6 illustrated in FIG. 9. In this case, the bevel 23 of the tooth A6 then promotes the transfer of the chain from the large sprocket A to the small sprocket C. For both situations illustrated in FIGS. 7 and 8 on the one hand, and in FIG. 9 on the other hand, there is preferential shifting on a defined tooth A5 or A6 of the large sprocket A. The chain B will therefore shift with a higher probability to the small sprocket C if, after an adjustment or bias has been applied to the guide wheel 10 toward the smaller sprocket C, the tooth A5 or A6 is present in the approach area 15.

Generally, FIG. 1 shows that there can be a total of three enlarged tooth spaces ZA on the large sprocket A, and two or more enlarged tooth spaces ZC, possibly three, on the small sprocket C. This results from the above-mentioned ratio of the number of teeth 21:18, which results in a difference of three in the number of teeth.

It should be understood that, in accordance with at least one preferred embodiment of the present invention, the number of enlarged tooth spaces ZA and ZC can be chosen as deemed appropriate. Although only two enlarged tooth spaces ZC are specifically illustrated in FIG. 1, it is to be understood that three or more may conceivably be employed. Additionally, any additional tooth spaces ZC over two could conceivably be positioned intermediate to the two illustrated in FIG. 1. In the case of three tooth spaces ZC, it is conceivable to distribute the same at substantially regular intervals, i.e. at about 120° apart with respect to one another.

Therefore, with a predetermined angular orientation of the two gear wheels A and C, as shown in the Figures, three transfer regions are preferably created, for example, in which transfers are possible both from the large sprocket A to the small sprocket C, and also from the small sprocket C to the large sprocket A. In these transfer regions, there are preferably always corresponding toothing configurations of the two sprockets. The tooth ratios described above with reference to FIGS. 1 to 9 are preferably present in the vicinity of each of these enlarged tooth spaces ZA and ZC, so that the shifting can preferably take place from the small sprocket C to the large sprocket A in a total of 3 positions each, and for shifting from the large sprocket A to the small sprocket C, there is a preference at three positions. On account of the facilitated transfer of the chain B from the large sprocket A to the small sprocket C, of course it cannot be guaranteed that each time the guide wheel 10 approaches the small sprocket C, the shifting will essentially occur only in the preferred positions, as described above with reference to FIGS. 7 to 9. But there is an increased probability that the shifting will take place at these preferred positions, so that the rider will tend to find the action of shifting from the large sprocket A to the small sprocket C under load to be particularly smooth and quiet.

Figure 10:
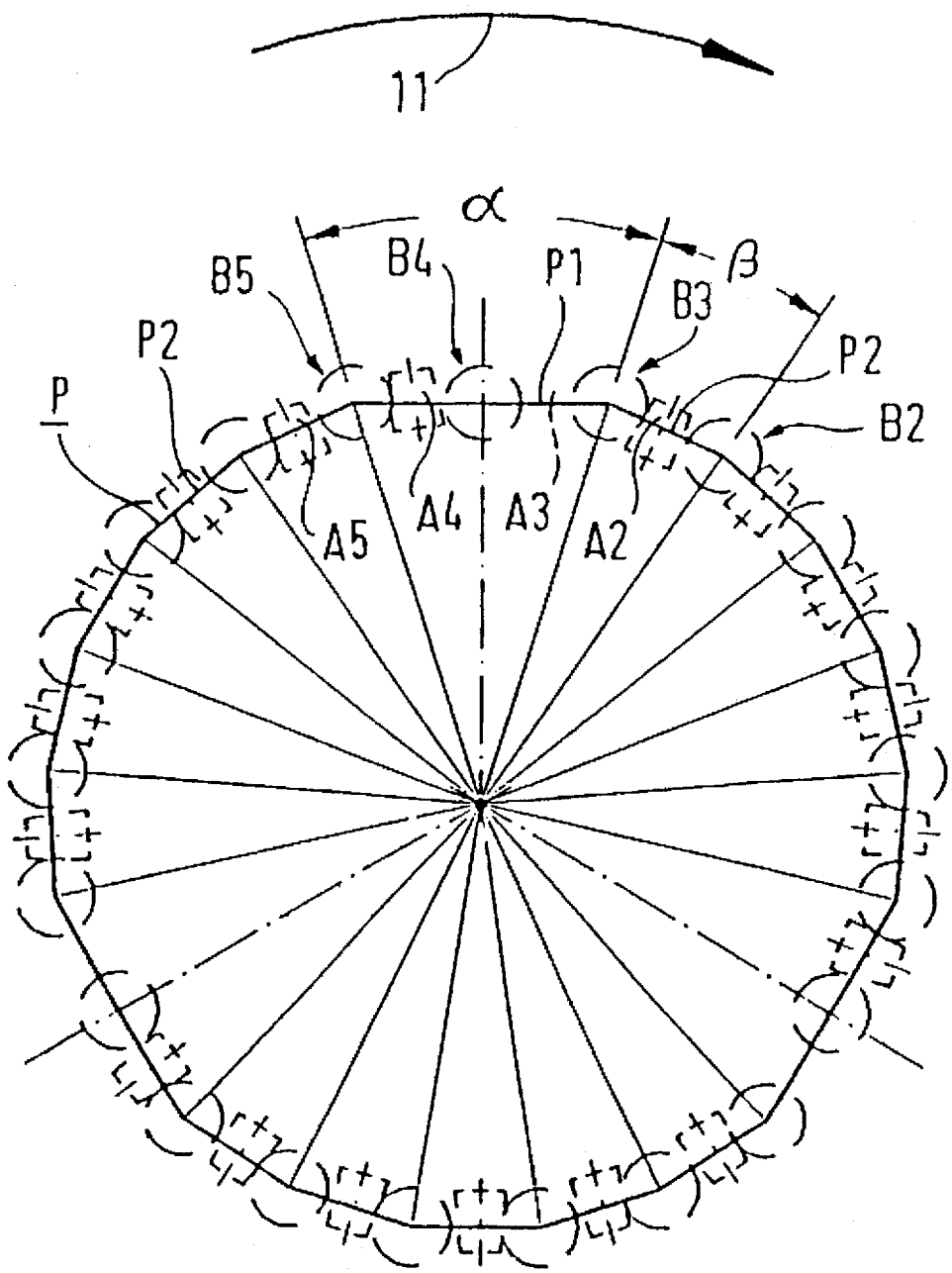
FIG. 10 is a schematic diagram of the distribution of teeth and tooth spaces on a sprocket, corresponding approximately to the larger sprocket illustrated in FIG. 1.
Figure 11:
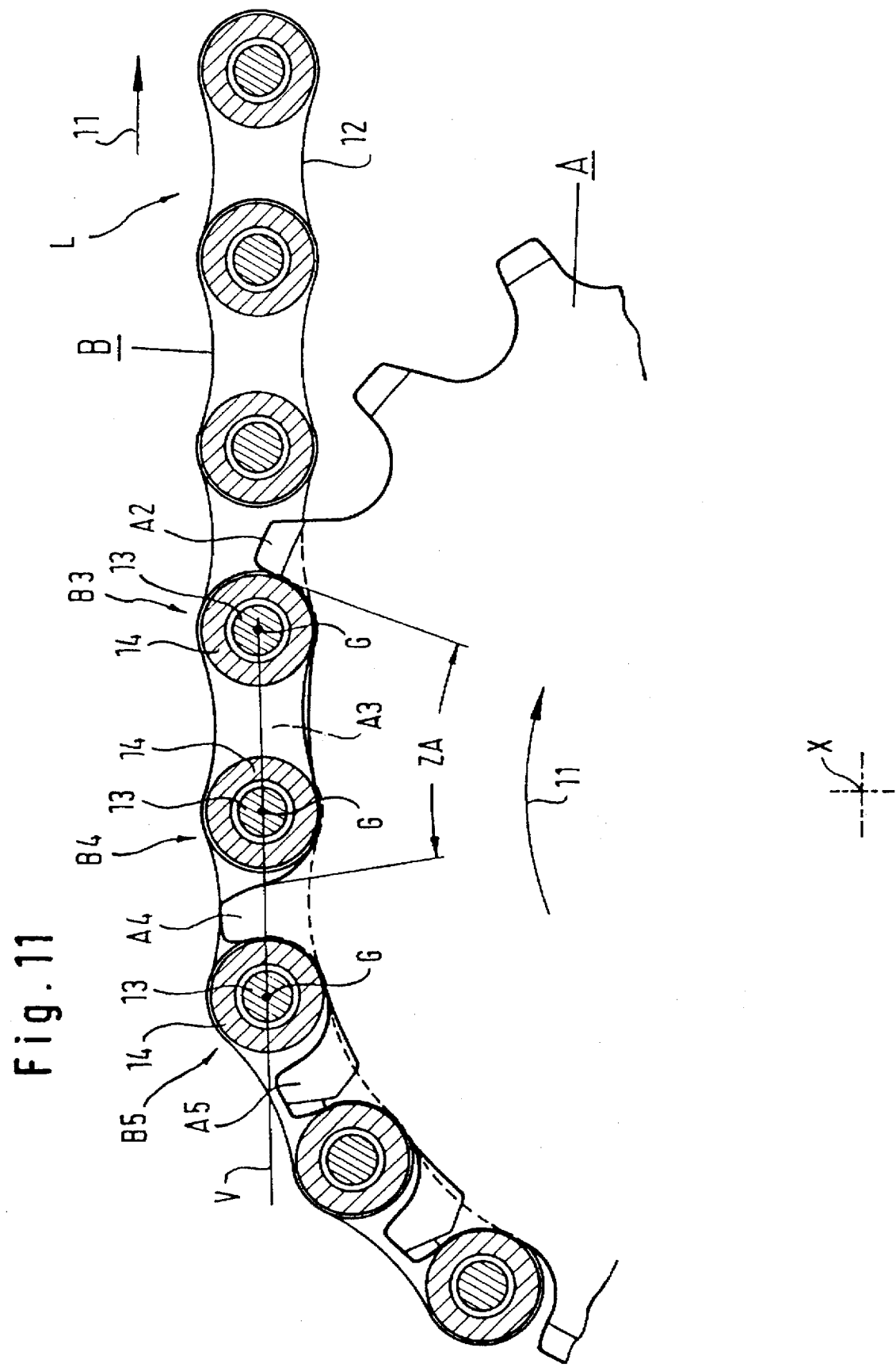
FIG. 11 shows the runout of the chain from the sprocket as illustrated in FIG. 10.

With reference to FIGS. 10 and 11, the following information should also be noted. FIG. 11 shows in particular the engagement situation between the large sprocket A and the chain B, in which the chain rollers 13 and the corresponding chain rollers 14 with their link axes G are oriented on a straight connecting line V. This essentially does not correspond to the simple omission of a tooth in the position A3 between the teeth A2 and A4; rather, the tooth space ZA is configured differently than if only the tooth A3 had been "filed away" between the teeth A2 and A4. The orientation of the link axes G of the hinge points B3, B4 and B5 on the straight connecting line V essentially means that in spite of the presence of the enlarged tooth spaces ZA in the large sprocket A (but this is also true for the small sprocket C), there are essentially always perfect engagement conditions between the chain and the tooth spaces, including the enlarged tooth spaces. In this regard, it can also be imagined that the chain segment between the hinge points B3 and B5, in spite of the intermediate hinge point B4, behaves like a single rigid chain section between the hinge points B3 and B5, which corresponds to the increased length of the tooth space ZA. This is of major importance, in particular if, as shown in FIGS. 1 and 11, the chain B runs off the sprocket set A,C in the area L, and the connecting line V lies approximately parallel to the top strand 12 of the chain which leads to a sprocket on the crankset side.

It has been determined that the configuration which is expressed in the orientation of the hinge points B3, B4 and B5 on a common connecting line tends to achieve an improved chain shifting action, both from the point of view of smoothness and quietness, and also from the point of view of the wear and tear both on the chain and on the sprockets.

The system which is illustrated on an enlarged scale in FIG. 11 is illustrated in FIG. 10 by means of the total circumference of the sprocket set. FIG. 10 shows an irregular polygon line P, within which elongated polygon sides P1 alternate with shorter polygon sides P2. The longer polygon sides P1 correspond to a central angle (alpha) and preferably extend from the hinge point B5 to the hinge point B3. The polygon side P1 thereby corresponds to the connecting line V illustrated in FIG. 11. The shorter polygon side P2 corresponds, for example, to the connection between the hinge point B2 and the hinge point B3. The teeth A2, A4, A5 and the missing tooth space A3 are also indicated schematically in FIG. 10. The design of a sprocket illustrated in FIG. 10 is complex, to the extent that the distribution of the teeth and tooth spaces over the circumferences essentially must be calculated individually each time on the basis of the polygon line P.

It is known that the polygon-like distribution of the hinge points on a sprocket leads to fluctuations in the level of torque transmitted, and therefore to changes in the torque which can be felt by the rider, even if the polygon is a regular, equilateral polygon.

In the configuration claimed by the invention of a sprocket as illustrated in FIG. 10, the possibility of such fluctuations is increased even further on account of the non-uniformity of the polygon. But it has been determined that this phenomenon is acceptable, if we consider the advantage of the reduced wear on the chain and sprocket, and the reduced level of noise generated during shifting.

The preceding explanation, which is based on two sprockets of a driven sprocket set on the rear wheel hub of a bicycle, essentially also applies for any other pairing of two neighboring sprockets, if the sprocket set has more than two such sprockets. The design of all of the sprockets must preferably be determined with regard to the number of teeth on the neighboring sprockets, and with particular regard to the ratios of the number of teeth between neighboring sprockets. Likewise, the angular adjustment between the sprockets of each pair of sprockets must be determined once and for all, so that during shifting from the small sprocket to the large sprocket, the chain length of the curved or bent chain segment B1–B5 between the hinge points B1 and B5 corresponds at least approximately to the path of this chain segment between the hinge points B1 and B5 specified by the prevailing tooth geometry. If there is a difference of more than 3 in the number of teeth, even more than the above-mentioned hinge points B1–B5 can fall in the transfer area. In addition, it is generally not essential that radially inside an enlarged tooth space ZA of the larger sprocket A, there must be an enlarged tooth space ZC of the smaller sprocket C, and in particular the forward location of the enlarged tooth space ZC of the smaller sprocket in relation to the enlarged tooth space ZA of the larger sprocket illustrated in FIG. 1 is not essential. The transfer chain segment T may be neither too loose nor too tight if, on one hand, the hinge point B1 is engaged between the teeth C1 and C2 and on the other hand, the hinge point B5 is engaged between the teeth A4 and A5. Only then is it essentially guaranteed that there will be a smooth and quite transfer of the torque transmission between the different sprockets.

It essentially goes without saying that in each sprocket, the distance between the midpoints of two chain rollers 14 which are engaged, i.e. the segment between the midpoints of chain rollers B2 and B3 corresponds approximately to the chain pitch from hinge point to hinge point. This essentially must be true for all the sprockets participating in the action.

The principles explained above on the basis of a rear hub sprocket set of a bicycle can also be applied if a derailleur on the crankset is equipped with several sprockets, and to change the translation ratio between the sprockets of the crankset derailleur.

The preceding explanation also assumed that only one tooth was omitted between two successive teeth of a sprocket. It is also possible that more than one tooth can be omitted between two successive teeth of the respective sprocket set, in which case the polygon illustrated in FIGS. 10 and 11 becomes unequal. The advantage of omitting more than one tooth between two neighboring teeth is that the "channel" for the passage of the chain B can then be even larger, so that problems caused by the deflection of the chain B from its plane of circulation can be prevented during the shifting of the chain.

As noted several times in the preceding explanation, the spur provided on the large sprocket A in the enlarged tooth space ZA essentially does not function in any way as a tooth; it is used essentially only for the lateral guidance of the chain B when the chain B is moving backward, opposite to the normal direction of circulation 11. As a rule, if the spur is present at all, it is provided essentially only in the enlarged tooth spaces of the largest sprocket or of the largest sprockets of a set of sprockets.

Figure 12:
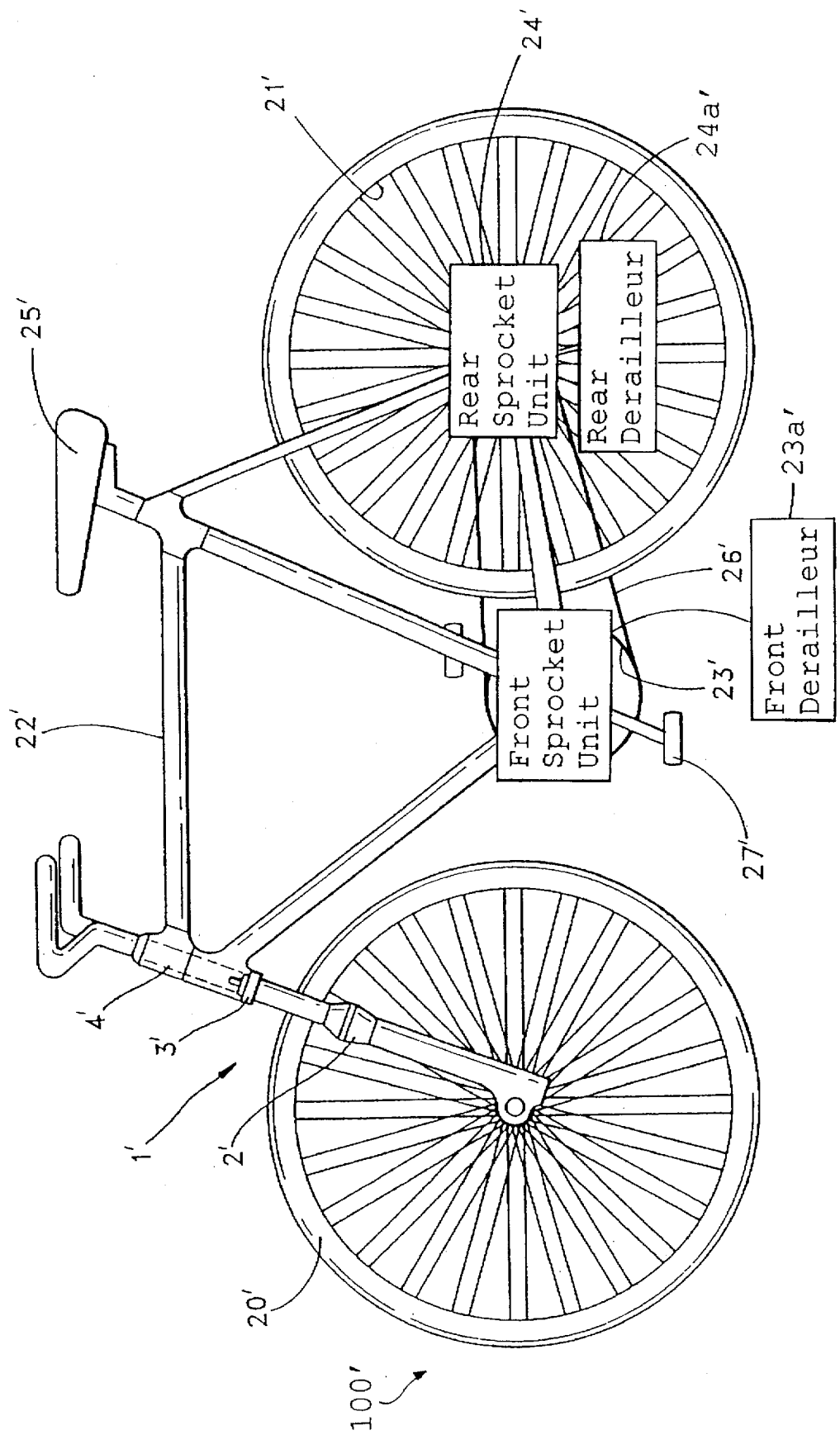
FIG. 12 illustrates a bicycle in which the present invention may be employed.

FIG. 12 shows a bicycle 100' in which the present invention may be employed. Such a bicycle 100' may typically have a front wheel 20' and a rear wheel 21'. The wheels 20', 21' may typically be attached to a frame 22'. Typically, movement of a pulley-like, chain-and-pedal system will cause the rear wheel 21' to rotate. Particularly, pedals 27' may typically be attached to the hub of a front sprocket unit 23', whereby such a front sprocket unit 23' would be configured to engage a chain 26'. Typically, when the pedals 27' are moved in a forward circular direction, chain 26' will be turned by front sprocket unit 23'. Chain 26' can typically be connected, in pulley-like fashion, to rear sprocket unit 24', which is preferably attached to rear wheel 21'. Other components typically provided are a seat 25' attached to frame 22', a front fork 1' with fork tubes 2', a steering head 3' and a handlebar stem 4' connected to steering head 3'.

A rear derailleur 24a' can typically be provided in conjunction with rear sprocket unit 24' while a front derailleur 23a' can typically be provided in conjunction with front sprocket unit 23'.

It will be understood that the components discussed above with relation to FIG. 12 may, if appropriate, essentially be considered to be interchangeable with similar components discussed further above with relation to FIGS. 1–11. For example, the guide wheel 10 discussed further above may be considered to be interchangeable with rear derailleur 24a' of FIG. 12.

One feature of the invention resides broadly in the derailleur, in particular for bicycles, comprising a driving sprocket unit and a driven sprocket unit A–C as well as a chain B which connects these two sprocket units to one another, whereby at least one A–C of the sprocket units is designed as a multi-sprocket unit A–C with at least two sprockets A,C, namely a larger sprocket A and a smaller sprocket C, whereby additionally, the two sprockets A,C of the multi-sprocket unit A–C each have a number of teeth A1 . . . ; C1 . . . and at least one tooth space ZA, ZC formed between each tooth pair A1, A2; C1, C2, whereby, additionally, the chain B is formed by successive chain links B1 . . . , inner side plate pairs D2i and outer side plate pairs D3a in alternating sequence between the chain links B1 . . . , whereby additionally, to shift the chain between the two sprockets A,C of the multi-sprocket unit A–C, there is a shifting device 10 in an inlet area 15, which in the normal direction of rotation 11 of the chain B and of the sprockets A,C runs the chain B into the multi-sprocket unit A–C, and this shifting device 10 is designed to impart movements to the chain B in a direction which is parallel to the axis X of the multi-sprocket unit A–C, whereby additionally, during the shifting of the chain B between the sprockets A,C of the multi-sprocket unit A–C, a chain transfer segment B1–B5 is formed between a previously-occupied sprocket C and a newly-occupied sprocket A of the two sprockets, which chain transfer segment B1–B5 traverses the circulation area of the multisprocket unit A–C from the chain inlet area 15 to a chain outlet area L of the multisprocket unit A–C, whereby additionally, the chain transfer segment B1–B5 extends opposite to the normal direction 11 of circulation of the sprocket set A,C from a chain link B1 which is the last chain link B1 engaged between two final teeth C1, C2 of a final tooth pair C1, C2 of the formerly-occupied sprocket C, to a chain link B5, which is the first link engaged between two first teeth A4, A5 of a first tooth pair A4, A5 of the newly-occupied sprocket A, and whereby in at least a chain transfer circumferential area T of the multisprocket unit A–C corresponding to the direction of chain shifting in the direction from a smaller sprocket C to a larger sprocket A, measures are provided on the sprockets A,C to facilitate the shifting of the chain B in this chain transfer circumferential area T between the two sprockets from the smaller sprocket C to the larger sprocket A, and to define the path of the corresponding chain transfer segment B1–B5, characterized by the following features: in the chain transfer circumferential area T corresponding to the shifting from the smaller sprocket C to the larger sprocket A, one tooth is omitted at A3 on the sprocket A next to the smaller sprocket, forming a double tooth space ZA, which in the normal direction of circulation 11 follows the preceding first tooth A4 of the first tooth pair A4, A5 of the larger sprocket A; on the large sprocket A, on its lateral surface facing the smaller sprocket C, in the base area of a tooth A2 which precedes the double tooth space ZA in the normal direction of circulation 11 and, if desired, a side plate support ramp 16 is formed in the leading terminal area of the double tooth space ZA, which side plate support ramp, in the normal direction of circulation 11 trails the trailing final tooth C2 of the final tooth pair C1, C2 of the smaller sprocket C; as a result of the side plate support ramp 16 and a base ZA1 of the double tooth space ZA, a path B1, B2, B3, B4, B5 of the chain transfer segment B1–B5 which is convexly bent or curved radially outward—seen in the axial direction—is forced inside the chain transfer circumferential area T between the first tooth pair A4, A5 of the larger sprocket A and the final tooth pair C1, C2 of the smaller sprocket C, whereby the curved chain transfer segment B1–B5 empties into the tooth space C1–C2 between the last two teeth C1, C2 of the final tooth pair C1, C2 of the smaller sprocket C; the first tooth A4 of the first tooth pair A4, A5 of the larger sprocket A, which tooth leads in the normal direction of circulation 11, is designed for engagement both between the side plates of an inner side plate pair D5i and also between the side plates of an outer side plate pair D5a.

Another feature of the invention resides broadly in the derailleur characterized by the fact that the tooth A4, C4 located in the direction of circulation in front of the tooth space ZA, ZC, viewed in the axial direction, has on the outside an indentation, consisting of an outer surface A7''', C7''' which runs in the direction of circulation, to support the chain inner side plates B, and a diagonal surface A8''', C8''' perpendicular to it which is used for the passage of the chain B, and/or that in the direction of circulation of the second tooth A1, C1 following the tooth space ZA, ZC, there is an indentation, consisting of an outer surface A7''', C7''' which runs in the direction of circulation, to support the chain inner side plates B, and a diagonal surface A8''', C8''' perpendicular to it which is used for the passage of the chain B.

Yet another feature of the invention resides broadly in the derailleur characterized by the fact that at least one tooth A9''', C9''' has a bevel in the axial direction on the rear side, whereby this tooth A9''', C9''' is located in the vicinity of the side plate support ramp 16 of the neighboring larger sprocket which lies opposite.

Still another feature of the invention resides broadly in the derailleur characterized by the fact that trailing the tooth A9''', C9''' with the bevel in the direction of circulation is a tooth A8''', C8''' which has an indentation located on the outside, viewed in the axial direction.

A further feature of the invention resides broadly in the derailleur characterized by the fact that preceding the tooth $A9'''$, $C9'''$ with the bevel in the direction of circulation is a tooth space ZA, ZC.

Another feature of the invention resides broadly in the derailleur, in particular for bicycles, comprising a driving chain wheel unit and a driven chain wheel unit A–C as well as chain B which connects these two sprocket units to one another, whereby at least one A–C of the sprocket units is designed as a multi-sprocket unit A–C with at least two sprockets A,C, namely a larger sprocket A and a smaller sprocket C, whereby additionally, the two sprockets A,C of the multi-sprocket unit A–C each have a number of teeth A1 . . . ; C1 . . . and at least one tooth space ZA, ZC formed between each tooth pair A1, A2; C1, C2, whereby, additionally, the chain B is formed by successive chain links B1 . . . , inner side plate pairs D2$i$ and outer side plate pairs D3$a$ in alternating sequence between the chain links B1 . . . , whereby additionally, to shift the chain between the two sprockets A,C of the multi-sprocket unit A–C, there is a shifting device 10 in an inlet area 15, which in the normal direction of rotation 11 of the chain B and of the sprockets A,C runs the chain B into the multi-sprocket unit A–C, and this shifting device 10 is designed to impart movements to the chain B in a direction which is parallel to the axis X of the multi-sprocket unit A–C, whereby additionally, during the shifting of the chain B between the sprockets A,C of the multi-sprocket unit A–C, a chain transfer segment B1–B5 is formed between a formerly-occupied sprocket C and a newly-occupied sprocket A of the two sprockets, which chain transition segment B1–B5 traverses the circulation area of the multisprocket unit A–C from the chain inlet area 15 to a chain outlet area L of the multisprocket unit A–C, whereby additionally, the chain transfer segment B1–B5 extends opposite to the normal direction 11 of circulation of the sprocket set A,C from a chain link B1 which is the last chain link B1 engaged between two final teeth C1, C2 of a final tooth pair C1, C2 of the formerly-occupied sprocket C, to a chain link B5, which is the first link engaged between two first teeth A4, A5 of a first tooth pair A4, A5, of the newly-occupied sprocket A, and whereby in at least a chain transfer circumferential area T of the multisprocket unit A–C corresponding to the direction of chain shifting in the direction from a smaller sprocket C to a larger sprocket A, measures are provided on the sprockets A,C to facilitate the shifting of the chain B in this chain transfer circumferential area T between the two sprockets from the smaller sprocket C of the larger sprocket A, and to define the path of the corresponding chain transfer segment B1–B5, characterized by the fact that there is at least one space between two successive teeth A2, A4 of a sprocket A, whereby the base of the tooth in the roller support area of the tooth space ZA, ZC has an elevation, at least in the area trailing in the direction of circulation, with respect to the root circle of the bases of the other teeth.

Examples of bicycles, in which the embodiments of the present invention may be employed, may be found in the following U.S. Patents: U.S. Pat. No. 5,324,059, which issued to Bryne on Jun. 28, 1994; U.S. Pat. No. 5,312,125 which issued to Tse-acu-a-o-shu on May 17, 1994; U.S. Pat. No. 5,242,182, which issued to Bezerra et al. on Sep. 7, 1993; and U.S. Pat. No. 5,240,268, which issued to Allsop et al. on Aug. 31, 1993.

Examples of derailleurs, which may be utilized in accordance with the embodiments of the present invention, may be found in the following U.S. Patents: U.S. Pat. No. 4,439,171, which issued to Bergles on Mar. 27, 1984; U.S. Pat. No. 4,231,264, which issued to Bergles on Nov. 4, 1980; U.S. Pat. No. 4,183,255, which issued to Leiter on Jan. 15, 1980; and U.S. Pat. No. 3,927,904, which issued to Bergles on Dec. 23, 1975.

The present invention may also generally relate to a derailleur arrangement, in particular for bicycles, comprising a driving sprocket unit and a driven sprocket unit, a well as a chain connecting these two sprocket units to one another, whereby at least one of the sprocket units is designed as a multisprocket unit with at least two sprockets, namely a larger sprocket and a smaller sprocket. In addition, the two sprockets of the multisprocket unit each typically have a number of teeth and a corresponding number of spaces formed between each pair of teeth. In addition, the chain is typically formed by successive chain links end by inner and outer link plate pairs in alternating sequence between the chain links. In addition, to shift the chain between the two sprockets of the multisprocket unit, there is typically a shifter in an approach area in which, in the normal direction of circulation of the chain and of the sprockets, the chain approaches the multisprocket unit, and this shifter is designed to impart motions to the chain in a direction parallel to the axis of the multisprocket unit.

In addition, when the chain is shifted between the sprockets of the multisprocket unit, a chain transfer segment is typically formed between the sprocket from which the chain is being transferred and the sprocket to which the chain is being transferred, which chain transfer segment traverses the circulation area of the multisprocket unit from the chain approach area to a chain runout area of the multisprocket unit. In addition, the chain transfer segment typically extends opposite to the normal direction of circulation of the sprocket set, from a chain link which is the last chain link engaged between two final teeth of a final pair of teeth of the sprocket from which the chain is being transferred, to a chain link which is the first link engaged between two first teeth of a first pair of teeth of the sprocket to which the chain is being transferred, and whereby in at least one chain transfer circumferential area of the multisprocket unit, corresponding to the chain shifting in the shifting direction from a smaller sprocket to a larger sprocket, design measures are applied to the sprockets in this chain transfer circumferential area, to facilitate the shifting of the chain between the two sprocket wheels, at least in the shifting direction from the smaller sprocket to a larger sprocket, and to define the path of the corresponding chain transfer segment.

DE-C2 28 37 270 discloses a known bicycle derailleur with a chain and a set of sprockets, the set of sprockets having at least one smaller sprocket and at least one larger sprocket oriented coaxially to and at some distance from this larger sprocket. The larger sprocket has at least two teeth which are designed to facilitate engagement with the chain. During the shifting process, the chain must apparently be engaged essentially at all times with, one one hand, a link pin between two teeth of a pair of teeth of the larger sprocket, and, on the other hand, with a link pin between two teeth of a pair of teeth of the smaller sprocket, and thereby, the chain, i.e. in its path between these two link pins, it must apparently extend tangentially to the smaller sprocket end bridge the distance between the pairs of teeth of the two sprockets. The distance from the midpoint of the one pair of teeth, between which the one link pin is engaged, and the midpoint of the other pair of teeth, between which the other link pin is engaged, must thereby apparently be an integral multiple of the chain pitch, and the two teeth of the pair of teeth of the larger chain wheel must apparently be designed or oriented to facilitate their engagement with the chain.

In the known embodiment, there are teeth over essentially the entire circumference of the larger sprocket. Some of the teeth are shortened to facilitate the transfer of the chain. On the larger sprocket, there are two pickup teeth, possibly safety or guide teeth, one of which is designed to be engaged between two inner link plates, and the other to be engaged between two outer link plates. Both pickup teeth have engagement flanks for the engagement with the link pins. Both pickup teeth are made thinner by setting the teeth toward the smaller sprocket. On account of this thinning, which is designed to facilitate the transfer of the chain from the smaller sprocket to the larger sprocket, there tends hardly to be essentially any possibility of applying additional design measures to three teeth, to facilitate the transfer from the larger sprocket to the smaller sprocket.

An object of the invention is to make possible a further simplification of the transfer, in particular from the smaller sprocket to the larger sprocket, but also, if necessary, from the larger sprocket to the smaller sprocket. In particular, the object of the invention is to make it possible, when a transfer from the smaller sprocket to the larger sprocket must be made under load, to accomplish this transfer quietly and smoothly, and so that the chain is engaged as quickly as possible with the newly-selected sprocket.

The invention teaches that the above object can be achieved by the combination of the following characteristics:

a) In the chain transfer circumference area corresponding to the shift from the smaller sprocket to the larger sprocket, one tooth is preferably omitted on the larger sprocket, thereby forming a double tooth space, which in the normal direction of circulation precedes the first tooth of the first pair of teeth of the larger sprocket.

b) On the larger sprocket, on its side surface facing the smaller sprocket, in the base area of a tooth which precedes the double tooth space in the normal direction of circulation, if desired, a link support plate is formed in the leading terminal area of the double tooth gap, which support plate, in the normal direction, preferably trails the trailing last tooth of the last tooth pair of the smaller sprocket;

c) As a result of the link support plate and a base of the double tooth space, there is, viewed in the axial direction, essentially a path of the chain transfer segment which is curved or bent convexly, radially outwardly, and is forced inside the chain transfer circumference segment between the first pair of teeth of the larger sprocket and the last pair of teeth of the smaller sprocket, whereby the curved chain transfer segment is confluent with the tooth space between the last two teeth of the last pair of teeth of the smaller sprocket;

d) The first tooth of the first pair of teeth of the larger sprocket leading in the normal direction of circulation is designed for engagement both between the link plates of an inner plate pair and also between the link plates of an outer plate pair.

It has been determined that there is an excellent shifting action under load, in the configuration contemplated by the invention. It has also been shown that the derailleur, as claimed by the invention, preferably has a high resistance to wear both on the chain side and on the sprocket side. This favorable resistance to wear may be due in particular to the presence of the double tooth space since, even if, in the double tooth space of the larger sprocket there is a spur which, in the event of a reverse movement of the chain, is designed to essentially guarantee the lateral position of the chain and which does not act as a tooth, the pitch of the chain in relation to its plane of circulation tends to generate less wear than in similar known devices, because the pitch angle in relation to the plane of circulation is essentially reduced. Thanks to the channel formed by the double tooth space of the larger sprocket for transfer of the chain during shifting from the smaller sprocket to the larger sprocket, there is essentially no need for a shortening of the teeth, of the larger sprocket, which participate in the transfer. The torque transmission action at the points of engagement between the chain links and the teeth is essentially improved both during the shifting process and also during normal operation, which in turn can have positive effects on the wear experienced by the equipment. As a result of the presence of the channel in the form of the double tooth space of the larger sprocket, one and the same tooth between a pair of link plates, regardless of whether it is an inner pair of link plates or an outer pair of link plates, is essentially always active as the first tooth of the new, larger sprocket to which the chain is being transferred. Therefore, at most, essentially all that is required is a machining of this one tooth with regard to the shifting of the chain from the smaller sprocket to the larger sprocket. Consequently, if there is essentially no need for a machining of additional teeth to serve this purpose, additional teeth are available for machining which will facilitate the shifting of the chain from the larger sprocket to the smaller sprocket, without any danger that as a result of double machining, with regard to the two directions of shifting, there is any need for any work which may cause excess wear and may increase the danger that a tooth will break. In other words, in accordance with at least one preferred embodiment of the present invention, if there is no need to machine additional teeth for the purpose of facilitating the shifting of the chain from the smaller sprocket to the larger sprocket, then such additional teeth could be machined instead for the purpose of facilitating the shifting of the chain from the larger sprocket to the smaller sprocket. Because such additional teeth will not be doubly machined with regard to the two directions of shifting, the danger of inviting excess wear of the teeth, which could otherwise increase the risk that a tooth will break, can be avoided.

It has also been determined that the configuration contemplated by at least one preferred embodiment of the present invention is relatively insensitive to malfunctions, which can occur when there is wear in the shifting path, which causes the chain, during shifting from the smaller sprocket to the larger sprocket, to move "too far" in the direction of the larger sprocket. It has also been determined that on the derailleur as contemplated by at least one preferred embodiment of the present invention, the risk of the breaking of individual link plates can be reduced. In known solutions, this danger occurs frequently when, in the transfer segment, as a result of the pitch of the transfer segment in relation to its plane of circulation, a load is applied to two inner plates as a result of an increase in the distance between them caused by the tooth engaged between them, and as a result the outer link plates adjacent to the end of the link pin are forced apart by the link pin.

In at least one configuration contemplated by at least one preferred embodiment of the present invention, the link support plate can significantly facilitate the ascent of the chain in the radial direction relative to the larger sprocket to which the chain is to be shifted. This may be an additional reason why a shortening of teeth, which would result in decreased engagement, is essentially not necessary. This link support plate essentially promotes the convex curvature of the chain transfer segment. This curved path essentially contributes to lengthening the chain transfer segment compared to a hypothetical linear curve, with the result that the load on the chain, caused by the chain's pitch in relation to the chain's plane of circulation, is further reduced.

When the description of the invention herein speaks of sprockets, the sprockets in question are essentially both the set of sprockets facing the rear wheel of a bicycle and the chainwheels of a crankset. In the context of the present invention, the example illustrated is the set of sprockets on the rear wheel. Theoretically, this example can also be the sprockets of a crankset, but in this regard, certain modifications may be necessary, so that in the case of a rear wheel derailleur, the unloaded return strand of the chain approaches the sprocket set, while in the case of a crankset, the approach point is where the tension strand of the chain, which is under load in the normal direction of rotation, approaches the sprocket set.

The link support plate can essentially be formed by the radially inside edge of a relief-type depression in one of the lateral surfaces of the large sprocket facing the smaller sprocket. The relief-like depression thereby has a leading edge which runs essentially radially in relation to the axis of the multisprocket unit and is the leading edge in the normal direction of rotation, whereby a link plate adjacent to this leading edge in the axial direction also runs past this leading edge. Therefore an entire link plate essentially cannot enter into the relief-like depression, but as a result of the leading edge, the curvature of the chain in relation to its plane of rotation is influenced. An additional advantage is that the relief-like depression, in an area in front of a leading end of the link support plate corresponding to the normal direction of circulation, is expanded radially inward toward the axis of the multisprocket unit.

To facilitate the engagement of the leading first tooth of the first tooth pair of the larger sprocket in the normal direction of rotation between two link plates, in particular between two inner link plates, the invention teaches that it is possible to bevel, or slope, the leading first tooth of the first pair of teeth of the larger sprocket essentially on the lateral surface of said tooth that is farther from the smaller sprocket radially outward and toward the smaller sprocket.

To prevent a premature engagement of the chain to be shifted to the larger sprocket with teeth of the larger sprocket, i.e. in a manner of speaking, to give such teeth, which are not to be engaged as the first teeth during the shifting to the larger sprocket, a chain throw-off function, then at least some of those teeth of the larger sprocket, which are not identical to the leading first tooth of the first pair of teeth of the larger sprocket, can preferably be bevelled radially outward and away from the smaller sprocket on their side facing the smaller sprocket, and at least, and preferably, in a radially outer area of their radial height.

During reverse movement of the chain caused by reverse pedalling of the crankset, to provide protection under all circumstances against lateral slippage of the relaxed upper strand of the chain in the chain runout area (which becomes the approach area to a rear wheel derailleur), it is possible to insert, in place of the missing tooth in the double tooth space of at least the larger sprocket, a spur which, if it is axially adjacent to an inner plate, preferably lies outside the space between this inner plate pair, and namely on the outside of that inner plate which is farther from the smaller sprocket. If the spur is axially adjacent to an outer plate pair, then the spur preferably projects into the space between the plates of this outer plate pair. But, preferably, this spur will intentionally not be designed as a tooth, since if it were designed as a tooth, it could possibly not perform the channel function of the double tooth space. This spur must preferably, in particular, be short enough that it in no case is engaged in torque transmission engagement with the chain. If a torque transmission function of this spur is prevented, then it is essentially guaranteed that this spur will essentially never be under load, even when the derailleur is under load. If the absence of a load on this spur is guaranteed when torque is being transmitted between the chain and the sprocket, this spur can essentially be designed as thin as desired both in the circumferential direction of the sprocket and also in the transverse direction of the sprocket. The opportunity to make this spur thin also essentially means that the spur will not interfere with the formation of the channel in the area of the double tooth gap, regardless of whether the spur is in contact on the outside with an inner link plate, or projects between a pair of outer plates.

It has been determined that with the configuration of the derailleur described above, as a result of the double tooth space in the larger sprocket, there is also a preferential shifting in this area, if the chain is to be shifted from the larger sprocket to the smaller sprocket. This preferential shifting is desirable at one or more defined points, although the shifting from the larger sprocket to the smaller sprocket would appear to be less critical then the shifting of the chain from the smaller sprocket to the larger sprocket, for reasons which will be explained below. In addition to the double tooth gap on the larger sprocket, the double tooth gap which may also be present on the smaller sprocket can also contribute to this preferential shifting from the larger sprocket to the smaller sprocket. Additional measures can also be applied to teeth of the larger sprocket to facilitate the shifting of the chain from the larger sprocket to the smaller sprocket, in the chain transfer circumference area designed for shifting from the smaller sprocket to the larger sprocket.

Such a measure could preferably consist of the fact that the trailing first tooth of the first pair of teeth of the larger sprocket and/or the first tooth of the larger sprocket following this trailing first tooth in the normal direction of circulation has bevels on the side facing the smaller sprocket, in such a manner that the bevelled surfaces—when viewed in the radial direction from radially outward—run forward and away from the smaller sprocket in the normal direction of circulation. If both teeth, i.e. both the trailing first tooth of the larger sprocket and also the tooth following it in the normal direction of circulation, have such bevels, then a chain transfer segment corresponding to a shift of the chain from the larger sprocket to the smaller sprocket, when the chain's inner plate pair axially adjacent the trailing first tooth of the larger sprocket, with the outside of this inner plate disposed farther from the smaller sprocket, can be in contact with the bevel of the trailing first tooth of the first pair of teeth of the larger sprocket. If the axial outer plate pair of the chain transfer segment is axially adjacent the trailing first tooth of the first pair of teeth of the larger chain wheel, this first tooth is preferably engaged between the outer link plates of this outer plate pair; consequently, an inner link plate disposed farther from the smaller sprocket of an inner pair of plates following the above-mentioned pair of outer plates will be in contact with the bevel of the tooth of the larger sprocket trailing the first tooth of the first pair of teeth of the larger sprocket.

But to facilitate the shifting of the chain from the larger sprocket to the smaller sprocket, it is also conceivable to apply measures to those teeth of the larger sprocket which precede the double tooth space in the direction of circulation of the larger sprocket, and in particular on that tooth of the larger sprocket which immediately precedes the double tooth space, and possibly also on that tooth which is the second tooth preceding the double tooth space of the larger sprocket. In this manner, the pitch of the chain in relation to its plane of circulation can be initiated as early as in the vicinity of these teeth.

It is possible that the two sprockets, i.e. the larger sprocket and the smaller sprocket, are part of a larger group of sprockets of the multisprocket unit, in which case either the sprocket previously regarded as the larger sprocket would be the smaller sprocket in relation to an even larger sprocket adjacent to it, and/or the sprocket previously regarded as the smaller sprocket would be the larger sprocket in relation to a sprocket even smaller than itself, and whereby the indicated relationships apply for at least some of the adjacent sprockets which together form a pair of sprockets. The above-mentioned spur would appear to be required, if at all, essentially only in the vicinity of the double tooth space of the largest sprocket or of the largest sprockets.

To accomplish the shifting of the chain between two neighboring sprockets as quickly as possible after the shifting order is given by means of the chain shift lever, at least one preferred embodiment of the present invention contemplates that one pair of sprockets of a multisprocket unit has a number of chain transfer circumferential areas distributed over the circumference, in which the above-mentioned configurations, at least of the larger sprocket, but preferably also of the smaller sprocket, are present.

The formation of a double tooth space, as contemplated by at least one preferred embodiment of the present invention, at least with respect to the larger sprocket, results in a modified operation of the system formed by the chain and the sets of sprockets; this is true in particular if it is recalled—and it cannot be altogether ruled out—that the double tooth space can be achieved simply by omitting a tooth or "filing the tooth away" on a conventional sprocket with a constant tooth pitch over its entire circumference. A shifting action which is more pleasant for the user can be achieved if, when at least one tooth is omitted between two subsequent teeth of a sprocket, thereby forming a multi-tooth space, in particular a double tooth space, the contour of the multiple tooth space and the contour of the tooth space of a tooth space immediately following this multi-tooth space are coordinated with one another so that when a corresponding number of chain links are placed in these tooth gaps, their link axes lie at least approximately on a common connecting line, whereby the leading chain link in the multi-tooth space and the chain link located in the subsequent tooth space, at least during runout into the tension strand, participate jointly and proportionally in the transmission of the torque to the trailing flank of the tooth preceding them, and during the winding of the strand under tension onto the chainwheel of a driving set of sprockets, can participate jointly in the transmission of the torque to the trailing edge of the tooth preceding them.

In general, then, the midpoints of the tooth spaces of the sprocket essentially form an irregular polygon, whereby the link axes lying on a common connecting line form larger sides of the polygon.

In summary, one aspect of the invention resides broadly in a derailleur arrangement for a manually powered vehicle, such a vehicle having at least one wheel, at least one wheel hub mounted on the at least one wheel, and a chain for providing a torsional force to be transferred to the at least one wheel hub, the derailleur arrangement comprising: first sprocket means; the first sprocket means having: means for connecting with a wheel hub of the manually powered vehicle; means for receiving a torsional force from the chain and transferring the torsional force to the hub; second sprocket means; the second sprocket means having: means for connecting with a wheel hub of the manually powered vehicle; means for receiving a torsional force from the chain and transferring the torsional force to the hub; second sprocket means; the first sprocket means and the second sprocket means having a common axis of rotation; the first sprocket means and the second sprocket means each having a plane of rotation; means for transferring the chain between the first sprocket means and the second sprocket means; the chain transfer means comprising means for selectively imparting a displacement to the chain in either of a first direction and a second direction, the first direction being substantially opposite the first direction, the first and second directions being generally perpendicular to the plane of rotation of each of the first sprocket means and the second sprocket means; means for facilitating transfer of the chain between the first sprocket means and the second sprocket means; the means for facilitating transfer comprising: recess means disposed in at least one of the first sprocket means and the second sprocket means, the recess means having means for accommodating and supporting a portion of the chain during transfer of the chain between the first sprocket means and the second sprocket means and for guiding the chain, during transfer, between the first sprocket means and the second sprocket means; and the recess has a surface having a portion extending substantially at a right angle with respect to the planes of rotation of the first sprocket means and the second sprocket means.

Another aspect of the invention resides broadly in a derailleur arrangement for a manually powered vehicle, such a vehicle having at least one wheel, at least one wheel hub mounted on the at least one wheel, and a chain for providing a torsional force to be transferred to the at least one wheel hub, the derailleur arrangement comprising: first sprocket means; the first sprocket means having: means for connecting with a wheel hub of the manually powered vehicle; means for receiving a torsional force from the chain and transferring the torsional force to the hub; second sprocket means; the second sprocket means having: means for connecting with a wheel hub of the manually powered vehicle; means for receiving a torsional force from the chain and transferring the torsional force to the hub; second sprocket means; the first sprocket means and the second sprocket means having a common axis of rotation; the first sprocket means and the second sprocket means each having a plane of rotation; means for transferring the chain between the first sprocket means and the second sprocket means; the chain transfer means comprising means for selectively imparting a displacement to the chain in either of a first direction and a second direction, the first direction being substantially opposite the first direction, the first and second directions being generally perpendicular to the plane of rotation of each of the first sprocket means and the second sprocket means; the first sprocket means comprising a plurality of teeth; the second sprocket means comprising a plurality of teeth; the plurality of teeth of the first sprocket means and the second sprocket means comprising the means for receiving a torsional force; means for facilitating transfer of the chain between the first sprocket means and the second sprocket means; the means for facilitating transfer comprising: channel means for accommodating the chain as the chain is being transferred between the first sprocket means and the second sprocket means; the channel means being defined by the plurality of teeth of at least one of the first sprocket means and the second sprocket means; the channel means being oriented at a skew with respect to the planes of rotation of the first sprocket means and the second sprocket means; the plurality of teeth of at least one of the first sprocket means and the second sprocket means forming the channel means as a substantially straight path for permitting a substantially straight transfer of the chain, with respect to the planes of rotation of the first sprocket means and the second sprocket means, between the first sprocket means and the second sprocket means.

Yet another aspect of the invention resides broadly in a derailleur arrangement for a manually powered vehicle, such a vehicle having at least one wheel, at least one wheel hub mounted on the at least one wheel, and a chain for providing a torsional force to be transferred to the at least one wheel hub, the derailleur arrangement comprising: first sprocket means; the first sprocket means having: means for connecting with a wheel hub of the manually powered vehicle; means for receiving a full torsional force from the chain and transferring the full torsional force to the hub; second sprocket means; the second sprocket means having means for connecting with a wheel hub of the manually powered vehicle; means for receiving a full torsional force from the chain and transferring the full torsional force to the hub; second sprocket means; the first sprocket means and the second sprocket means having a common axis of rotation; the first sprocket means and the second sprocket means each having a plane of rotation; means for transferring the chain between the first sprocket means and the second sprocket means; the chain transfer means comprising means for selectively imparting a displacement to the chain in either of a first direction and a second direction, the first direction being substantially opposite the first direction, the first and second directions being generally perpendicular to the plane of rotation of each of the first sprocket means and the second sprocket means; the first sprocket means comprising a plurality of teeth; the second sprocket means comprising a plurality of teeth; a plurality of teeth of the first sprocket means and the second sprocket means comprising the means for receiving a full torsional force; means for facilitating transfer of the chain between the first sprocket means and the second sprocket means; the means for facilitating transfer comprising: means for locally substantially reducing on: at least one of the first sprocket means and the second sprocket means, and the chain, the transfer of the full torsional force between: at least one of the first sprocket means and the second sprocket means, and the chain; the means for locally substantially reducing the transfer of full torsional force being disposed between two teeth of the plurality of teeth for transferring full torsional force.

An additional feature of the invention resides broadly in the derailleur, in particular for bicycles, comprising a driving sprocket unit and a driven sprocket unit A–C, a well as a chain B connecting these two sprocket units to one another, whereby at least one A–C of the sprocket units is designed as a multisprocket unit A–C with at least two sprockets A, C, namely a larger sprocket A and a smaller sprocket C, whereby in addition, the two sprockets A, C of the multisprocket unit A–C each have a number of teeth A1 . . . ; C1 . . . and a corresponding number of spaces A1–A2; C1–C2 formed between each pair of teeth A1,A2; C1,C2, whereby, in addition, the chain B is formed by successive chain links B1 . . . and by inner D2*i* and outer D3*a* link plate pairs in alternating sequence between the chain links B1 . . . , whereby in addition, to shift the chain B between the two sprockets A, C of the multisprocket unit A–C, there is a shifter 10 in an approach area 15, in which in the normal direction of circulation 11 of the chain B and of the sprockets A, C, the chain B enters the multisprocket unit A–C, and this shifter 10 is designed to impart motions to the chain B in a direction parallel to the axis X of the multisprocket unit A–C, whereby, in addition, when the chain B is shifted between the sprockets A, C of the multisprocket unit A–C, a chain transfer segment B1–B5 is formed between a sprocket C from which the chain B is being shifted to the sprocket A to which the chain B is being shifted, which chain transfer segment B1–B5 traverses the circulation area of the multisprocket unit A–C from the chain approach area 15 to a chain runout area L of the multisprocket unit A–C, whereby, in addition, the chain transfer segment B1–B5 extends opposite to the normal direction of circulation 11 of the sprocket set A, C, from a chain link B1 which is the last chain link B1 engaged between two last teeth C1, C2 of a final pair of teeth C1, C2 of the sprocket C from which the chain B is being shifted, to a chain link B5 which is the first link engaged between two first teeth A4, A5 of a first pair of teeth A4, A5 of the sprocket A to which the chain B is being shifted, and whereby in at least a chain transfer circumferential area T of the multisprocket unit A–C corresponding to the shifting of the chain from a smaller sprocket C to a larger sprocket A, design measures are applied to the sprockets A, C in this chain transfer circumferential area T to facilitate the shifting of the chain B between the two sprockets A, C at least in the shifting direction from the smaller sprocket C to a larger sprocket A, and to define the path of the corresponding chain transfer segment B1–B5, characterized by the following features:

a) in the chain transfer circumferential area T corresponding to the shifting from the smaller sprocket C to the larger sprocket A, one tooth at A3 is omitted on the larger sprocket A, forming a double tooth space ZA, which in the normal direction of circulation 11 precedes the leading first tooth A4 of the first pair of teeth A4, A5 of the larger sprocket A;

b) on the large sprocket A, on its lateral surface facing the smaller sprocket C, in the base area of a tooth A2 (which in the normal direction of rotation 911) precedes the double tooth space ZA, and if desired there is also, in the leading terminal portion of the double tooth space ZA, a link support plate 16, which in the normal direction of rotation 11 follows the trailing last tooth C2 of the last tooth pair C1, C2 of the smaller sprocket C;

c) as a result of the link support plate 16 and a base ZA1 of the double tooth space ZA, there is a path B1, B2, B3, B4, B5 of the chain transfer segment B1–B5 which is curved or bent convexly radially outwardly inside the chain transfer circumferential area T between the first pair of teeth A4, A5 of the larger sprocket A and the last pair of teeth C1, C2 of the smaller sprocket C, whereby the curved chain transfer segment B1–B5 is confluent with the tooth space C1–C2 between the last two teeth C1, C2 of the last tooth pair C1, C2 of the smaller sprocket C;

d) the leading first tooth A4 of the first tooth pair A4, A5 of the larger sprocket A in the normal direction of circulation 11 is designed for engagement both between the chain plates of an inner link plate pair D5*i* and between the link plates of an outer lank plate pair D5*a*.

Another feature of the invention resides broadly in the derailleur characterized by the fact that on the smaller sprocket C, a tooth at C3 is omitted following the trailing last tooth C2 of the last tooth pair C1, C2, forming a multiple tooth space ZC on the smaller sprocket C.

Yet another feature of the invention resides broadly in the derailleur characterized by the fact that the link support plate 16 is formed by the radially inner edge of a relief-like recess 17 in one of the lateral surfaces of the larger sprocket A facing the smaller sprocket C.

Still another feature of the invention resides broadly in the derailleur characterized by the fact that the relief-like recess 17 has a leading edge 17a which runs essentially radially and which, in the normal direction of circulation 11, precedes the axis X of the multisprocket unit A–C, whereby a link plate D2ig which is adjacent in the axial direction to this leading edge 17a runs past this leading edge 17a.

A further feature of the invention resides broadly in the derailleur characterized by the fact that the relief-like repression 17 in a leading area corresponding to the normal direction of circulation 11 in front of a leading end of the link support plate 16 is extended radially inward toward the axis X of the multisprocket unit A–C.

Another feature of the invention resides broadly in the derailleur characterized by the fact that the leading first tooth A4 of the first tooth pair A4, A5 of the larger sprocket A is bevelled radially outward on its lateral surface 22 away from the smaller sprocket C and toward the smaller sprocket C.

Yet another feature of the invention resides broadly in the derailleur characterized by the fact that at least some of the teeth A1, A2, A5, A6 of the larger sprocket A, which are not identical to the leading first tooth A4 of the first tooth pair A4, A5 of the larger sprocket A, are bevelled radially outward on their side 27 facing the smaller sprocket C, and away from the smaller sprocket C, namely at least and preferably in a radially outer area 27 of their radial height.

Still another feature of the invention resides broadly in the derailleur characterized by the fact that at the position A3 of the omitted tooth of the double tooth space ZA, at least on the larger sprocket A, there is a spur 19, which if it is axially next to an inner link plate pair D4i lies outside the space between this inner link plate pair D4i, namely on the outside of the inner link plate D4ig which is farther from the smaller sprocket C, and which if it is axially next to an outside link plate pair D4a projects into the space between the link plates of this outer link plate pair D4a.

A further feature of the invention resides broadly in the derailleur characterized by the fact that to facilitate the shifting of the chain from the larger sprocket A to the smaller sprocket C, additional design measures are provided in the chain transfer circumference area for the transfer of the chain from the smaller sprocket C to the larger sprocket A on teeth A1, A2, A4, A5, A6 of the larger sprocket A.

Another feature of the invention resides broadly in the derailleur characterized by the fact that the trailing first tooth A5 of the first tooth pair A4, A5 of the larger sprocket A and/or the first tooth A6 following this trailing first tooth A5 following the latter in the normal direction of circulation 11 of the large sprocket A has bevels 27 on the side facing the smaller sprocket C, namely so that the bevelled surfaces 27—when viewed from radially outward in the axial direction—run forward and away from the smaller sprocket C in the normal direction of circulation 11.

Yet another feature of the invention resides broadly in the derailleur characterized by the fact that both teeth, i.e. both the trailing first tooth A5 of the larger sprocket A and also the tooth A6 following it in the normal direction of circulation 11 have bevels 23, whereby a chain transfer segment B5–B9 corresponding to the shifting of the chain from the larger sprocket A to the smaller sprocket C, if its inner link plate pair D6i is axially next to the trailing first tooth A5 of the larger sprocket A, is in contact with the outside of its inner link plate D6ig farther from the smaller sprocket C against the bevel 23 of the trailing first tooth A5 of the first tooth pair A4, A5 of the larger sprocket A, while if an outer link plate pair D7a of the chain transfer segment B5–B9 is axially next to the trailing first tooth A5 of the first tooth pair A4, A5 of the larger sprocket A, this first tooth A5 is engaged between the outer link plates of this outer link plate pair D7a and then an inner link plate D8ig of an inner link plate pair D8i following the above-mentioned outer link plate pair D7a is in contact against the bevel 23 of the tooth A6 of the larger sprocket A following the first tooth A5 of the first tooth pair A4, A5 of the larger sprocket A.

Still another feature of the invention resides broadly in the derailleur characterized by the fact that the first tooth A2 and possibly also the second tooth A1 of the teeth A1, A2 preceding the enlarged tooth space of the larger sprocket A is inclined, axially offset or bevelled radially outward to coordinate with the inclined position of the chain B which already starts there in relation to its plane of circulation.

A further feature of the invention resides broadly in the derailleur characterized by the fact that the two sprockets, i.e. the larger sprocket A and the smaller sprocket C, are part of a larger group of sprocket wheels of the multisprocket unit A–C, in which case either the sprocket A heretofore regarded as the larger sprocket becomes the smaller sprocket in relation to an even larger sprocket adjacent to it, and/or the sprocket C heretofore regarded as the smaller sprocket becomes the larger sprocket in relation to an even smaller sprocket, and whereby the relationships indicated in the preceding Claims 1–12 apply for at least some of the neighboring sprockets forming a pair of sprockets.

Another feature of the invention resides broadly in the derailleur characterized by the fact that there is a spur 19 only in the vicinity of the double tooth space of the largest sprocket A or of the largest sprockets of a multisprocket unit.

Yet another feature of the invention resides broadly in the derailleur characterized by the fact that corresponding to a sprocket pair A, C of a multisprocket unit A–C, there are a number of chain transfer circumferential areas T distributed over the circumference, in which the characteristics of the preceding Claims 1–14 are present either completely or approximately completely.

Still another feature of the invention resides broadly in the derailleur, in particular for bicycles, comprising a driving sprocket unit and a driven sprocket unit A–C, a well as a chain B connecting these two sprocket units to one another, whereby at least one A–C of the sprocket units is designed as a multisprocket unit A–C with at least two sprockets A, C, namely a larger sprocket A and a smaller sprocket C, whereby in addition, the two sprockets A, C of the multisprocket unit A–C each have a number of teeth A1 . . . ; C1 . . . and a corresponding number of spaces A1–A2; C1–C2 formed between each pair of teeth A1,A2; C1,C2, whereby, in addition, the chain B is formed by successive chain links B1 . . . and by inner D2i and outer D3a link plate pairs in alternating sequence between the chain links B1 . . . , whereby, in addition, to shift the chain B between the two sprockets A, C of the multisprocket unit A–C, there is a shifter 10 in an approach area 15, in which in the normal direction of circulation 11 of the chain B and of the sprockets A, C, the chain B enters the multisprocket unit A–C, and this shifter 10 is designed to impart movements to the chain B in a direction parallel to the axis X of the multisprocket unit A–C, whereby in addition, when the chain B is shifted between the sprockets A, C of the multisprocket unit A–C, a chain transfer segment B1–B5 is formed between a sprocket C from which the chain B is being shifted to the sprocket A to which the chain B is being shifted, which chain transfer segment B1–B5 traverses the circulation area of the multisprocket unit A–C from the chain approach area 15 to a chain runout area L of the multisprocket unit A–C, whereby, in addition, the chain transfer segment B1–B5 extends opposite to the normal direction of circulation 11 of the chain B, from a chain link B1 which is the last chain link B1 engaged between two last teeth C1, C2 of a final pair of teeth C1, C2 of the sprocket C from which the chain B is being shifted, to a chain link B5 which is the first link engaged between two first teeth A4, A5 of a first pair of teeth A4, A5 of the sprocket A to which the chain B is being shifted, and whereby in at least a chain transfer circumferential area T of the multisprocket unit A–C corresponding to the shifting of the chain from a smaller sprocket C to a larger sprocket A, design measures are applied to the sprockets A, C in this chain transfer circumferential area T to facilitate the shifting of the chain B between the two sprockets A, C at least in the shifting direction from the smaller sprocket C to a larger sprocket A, and to define the path of the corresponding chain transfer segment B1–B5, characterized by the fact that with the omission of at least one tooth at A3 between two successive teeth A2, A4 of a sprocket A and the resulting formation of a multiple tooth space, in particular a double tooth space ZA, the tooth space contour of the tooth space of this multiple tooth space ZA and the tooth space contour of a tooth space A4–A5 immediately following this multiple tooth space ZA are coordinated with one another so that when a corresponding number of chain links B3–B5 are present in these tooth spaces ZA, A4–A5, their link axes lie on a common straight connecting line V, whereby the leading chain link B3 in the multiple tooth space ZA and the chain link B5 located in the following tooth space A4, A5 are in at least proportional torque-transmitting contact during the runout into the tension strand jointly on the trailing edge of the tooth A2 or A4 preceding them, and during the winding of the tension strand of the chain onto the chainwheel of a driving sprocket set, are jointly in contact to transmit torque to the trailing flank of the tooth preceding them.

A further feature of the invention resides broadly in the derailleur characterized by the fact that the midpoints of the tooth spaces of the sprocket form an irregular polygon, whereby the link axes lying on a joint connecting line V form larger polygon sides G-G-G respectively.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. P 44 34 752.9, filed on Sep. 29, 1994, having inventor Jörg Bodmer, and DE-OS P 44 34 752.9 and DE-PS P 44 34 752.9, as well as their published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

The invention as described hereinabove in the context of the preferred embodiments is not to be taken as limited to all of the provided details thereof, since modifications and variations thereof may be made without departing from the spirit and scope of the invention.

What is claimed is:

1. A sprocket for a multi-sprocket arrangement for a manually-powered vehicle having at least one wheel, at least one wheel hub mounted on the at least one wheel, and a chain for providing a force to be transferred to the at least one wheel hub, said sprocket comprising:

means for connecting said sprocket with a wheel hub;
   a plurality of teeth for receiving a force from a chain and transferring a force to a wheel hub;
   said sprocket being configured to rotate about an axis of rotation;
   said sprocket being configured to rotate in a plane of rotation;
   means for facilitating transfer of a chain between said sprocket and an adjacent sprocket of the multi-sprocket arrangement;
   said means for facilitating transfer of a chain comprising:
   a tooth of said plurality of teeth;
   said tooth comprising an indentation;
   said indentation being disposed on the side of said sprocket for facing an adjacent sprocket;
   said indentation comprising a first surface of said tooth and a second surface of said tooth;
   said first surface being substantially disposed along the direction of rotation of said sprocket;
   said first surface being configured to support a portion of a chain during at least a portion of a transferring of a chain between said sprocket and an adjacent sprocket;
   said second surface being transverse to said first surface;
   said second surface being oriented at a skew with respect to the plane of rotation of said sprocket; and
   said second surface being configured to guide a chain during at least a portion of a transferring of a chain between said sprocket and an adjacent sprocket.

2. The sprocket according to claim 1, wherein:
   said means for facilitating transfer of a chain further comprises at least one tooth of said plurality of teeth of said sprocket being omitted to thereby form a multiple-tooth space in the form of a double-tooth space; and
   said tooth comprising said indentation is disposed substantially adjacent the multiple-tooth space.

3. The sprocket according to claim 2, wherein:
   said tooth comprising said indentation is a first tooth;
   said indentation of said first tooth is a first indentation;
   said first tooth is disposed on a side of the multiple-tooth space in the normal direction of rotation of said sprocket;
   said means for facilitating transfer comprises:
   a second tooth of said plurality of teeth;
   said second tooth is disposed substantially adjacent the multiple-tooth space;
   said second tooth is disposed on the opposite side of the multiple-tooth space from said first tooth;
   said second tooth comprises a second indentation;
   said second indentation is disposed on the same side of said sprocket as said first indentation;

said second indentation comprises a first surface of said second tooth and a second surface of said second tooth;

said first surface of said second tooth is substantially disposed along the direction of rotation of said sprocket;

said first surface of said second tooth is configured to support a portion of a chain during at least a portion of a transferring of a chain between said sprocket and an adjacent sprocket;

said second surface of said second tooth is transverse to said first surface of said second tooth;

said second surface of said second tooth is oriented at a skew with respect to the plane of rotation of said sprocket; and said second surface of said second tooth is configured to guide a chain during at least a portion of a transferring of a chain between said sprocket and an adjacent sprocket.

4. The sprocket according to claim 3, wherein:

said first tooth immediately precedes the multiple-tooth space in the normal direction of rotation of said sprocket; and said second tooth is the second tooth following the multiple-tooth space in the normal direction of travel.

5. The sprocket according to claim 4, wherein said sprocket further comprises:

a valley being formed between each tooth of said plurality of teeth;

the bottom of each valley lies on a circle;

said means for facilitating transfer of a chain further comprises:
an elevation;
said elevation is disposed in the multiple-tooth space;
said elevation is disposed substantially adjacent the tooth of said plurality of teeth that immediately follows the multiple-tooth space in the normal direction of rotation of said sprocket;
said elevation is elevated above the circle; and
said elevation is configured to support a portion of a chain during at least a portion of a transferring of a chain between said sprocket and an adjacent sprocket.

6. The sprocket according to claim 5, wherein the multi-sprocket arrangement comprises a second sprocket disposed adjacent said sprocket; the second sprocket has a larger diameter than said sprocket; the second sprocket comprises a link support plate; the link support plate is disposed adjacent said sprocket; the link support plate comprises a lateral surface of the second sprocket; the lateral surface of the link support plate is configured to accomodate and support a portion of a chain during at least a portion of a transferring of a chain between said sprocket and the second sprocket, said sprocket further comprising:

means for facilitating transfer of a chain between said sprocket and a second sprocket;
said means for facilitating transfer of a chain between said sprocket and a second sprocket comprises:
a third tooth of said plurality of teeth of said sprocket;
said third tooth immediately follows the multiple-tooth space in the normal direction of rotation of said sprocket;
said third tooth is configured to be disposed substantially adjacent a link support plate of a second sprocket;
said third tooth comprises a first side and a second side;

said first side of said third tooth is configured to be disposed adjacent a second sprocket;

said second side of said third tooth is opposite said first side of said third tooth;

said third tooth comprises a bevel configured in the axial direction of the axis of rotation; and said bevel of said third tooth is disposed on said second side of said third tooth.

7. A multi-sprocket arrangement for a manually-powered vehicle having at least one wheel, at least one wheel hub mounted on the at least one wheel, and a chain for providing a force to be transferred to the at least one wheel hub, said multi-sprocket arrangement comprising:

a first sprocket;

said first sprocket comprising means for connecting said first sprocket with a wheel hub;

said first sprocket comprising a plurality of teeth for receiving a force from a chain and transferring a force to a wheel hub;

a second sprocket;

said second sprocket being disposed adjacent said first sprocket;

each of said first sprocket and said second sprocket being configured to rotate about a common axis of rotation;

said second sprocket having a larger diameter than said first sprocket;

said second sprocket comprising means for connecting said second sprocket with a wheel hub;

said second sprocket comprising a plurality of teeth for receiving a force from a chain and transferring a force to a wheel hub;

means for facilitating transfer of a chain between said first sprocket and said second sprocket; and said means for facilitating transfer of a chain comprising:
said second sprocket comprising a link support plate;
said link support plate being disposed adjacent said first sprocket;
said link support plate comprising a lateral surface of said second sprocket;
said lateral surface of said link support plate being configured to accomodate and support a portion of a chain during at least a portion of a transferring of a chain between said first sprocket and said second sprocket;
a tooth of said plurality of teeth of said first sprocket;
said tooth being disposed substantially adjacent said link support plate;
said tooth comprising a first side and a second side;
said first side of said tooth being disposed adjacent said second sprocket;
said second side of said tooth being opposite said first side of said tooth;
said tooth comprises a bevel being configured in the axial direction of the axis of rotation; and
said bevel of said tooth being disposed on said second side of said tooth.

8. The sprocket arrangement according to claim 7, wherein said first sprocket further comprises:

means for facilitating transfer of a chain between said first sprocket and an adjacent sprocket of the multi-sprocket arrangement;

said means for facilitating transfer of a chain between said first sprocket and an adjacent sprocket comprises at least one tooth of said plurality of teeth of said first sprocket being omitted to thereby form a multiple-tooth space in the form of a double-tooth space; and said tooth comprising said bevel immediately follows the multiple-tooth space in the normal direction of rotation of said sprocket arrangement.

9. The sprocket arrangement according to claim 8, wherein said first sprocket further comprises:
   said first sprocket is configured to rotate in a plane of rotation;
   said tooth comprising said bevel is a first tooth;
   said means for facilitating transfer of a chain between said first sprocket and an adjacent sprocket further comprises:
      a second tooth of said plurality of teeth of said first sprocket;
      said second tooth is disposed substantially adjacent the multiple-tooth space;
      said second tooth comprises a first side and a second side;
      said second side of said second tooth is disposed adjacent said second sprocket;
      said first side of said second tooth is opposite said second side of said second tooth;
      said second tooth comprises an indentation;
      said indentation is disposed on said second side of said second tooth;
      said indentation comprises a first surface of said second tooth and a second surface of said second tooth;
      said first surface of said second tooth is substantially disposed along the direction of rotation of said sprocket arrangement;
      said first surface of said second tooth is configured to support a portion of a chain during at least a portion of a transferring of a chain between said sprocket and an adjacent sprocket;
      said second surface of said second tooth is transverse to said first surface of said second tooth;
      said second surface of said second tooth is oriented at a skew with respect to the plane of rotation of said first sprocket; and
      said second surface of said second tooth is configured to guide a chain during at least a portion of a transferring of a chain between said sprocket and an adjacent sprocket.

10. The sprocket arrangement according to claim 9, wherein said first sprocket means for facilitating transfer of a chain between said first sprocket and an adjacent sprocket further comprises:
   said second tooth is disposed on a side of the multiple-tooth space;
   a third tooth of said plurality of teeth of said first sprocket;
   said third tooth is disposed on the opposite side of the multiple-tooth space from said second tooth;
   said third tooth comprises a first side and a second side;
   said second side of said third tooth is disposed adjacent said second sprocket;
   said first side of said third tooth is opposite said second side of said second tooth;
   said third tooth comprises a second indentation;
   said second indentation is disposed on said second side of said third tooth;
   said second indentation comprises a first surface of said third tooth and a second surface of said third tooth;
   said first surface of said third tooth is substantially disposed along the direction of rotation of said sprocket arrangement;
   said first surface of said third tooth is configured to support a portion of a chain during at least a portion of a transferring of a chain between said first sprocket and an adjacent sprocket;
   said second surface of said third tooth is transverse to said first surface of said third tooth;
   said second surface of said third tooth is oriented at a skew with respect to the plane of rotation of said first sprocket; and
   said second surface of said third tooth is configured to guide a chain during at least a portion of a transferring of a chain between said first sprocket and an adjacent sprocket.

11. The sprocket arrangement according to claim 10, wherein:
   said second tooth of said first sprocket immediately precedes the multiple-tooth space of said first sprocket in the normal direction of rotation of said sprocket arrangement; and
   said third tooth of said first sprocket immediately follows said first tooth of said first sprocket in the normal direction of rotation of said sprocket arrangement.

12. The sprocket arrangement according to claim 11, wherein said second sprocket further comprises:
   a valley being formed between each tooth of said plurality of teeth of said second sprocket;
   the bottom of each valley lying on a circle;
   means for facilitating transfer of a chain between said second sprocket and an adjacent sprocket of the multi-sprocket arrangement;
   said second sprocket means for facilitating transfer of a chain between said second sprocket and an adjacent sprocket comprises:
      at least one tooth of said plurality of teeth of said second sprocket is omitted to thereby form a multiple-tooth space in the form of a double-tooth space;
      an elevation is disposed in the multiple-tooth space;
      said elevation is disposed substantially adjacent a tooth of said plurality of teeth of said second sprocket, said tooth of said plurality of teeth of said second sprocket immediately follows the multiple-tooth space of said second sprocket in the normal direction of rotation of said sprocket arrangement;
      said elevation is elevated above the circle; and
      said elevation is configured to support a portion of a chain during at least a portion of a transferring of a chain between said second sprocket and an adjacent sprocket.

13. The sprocket arrangement according to claim 12, wherein:
   said first sprocket comprises a first side and a second side;
   said first side of said first sprocket is adjacent said second sprocket;
   said second side of said first sprocket is opposite said first side of said first sprocket;
   said first sprocket comprises a valley being formed between each tooth of said plurality of teeth of said first sprocket;
   the bottom of each valley of said first sprocket lies on a circle; and
   said first sprocket means for facilitating transfer of a chain between said first sprocket and an adjacent sprocket comprises:
      a second elevation;
      said second elevation is disposed in the double-tooth space of said first sprocket;

said second elevation is disposed substantially adjacent said first tooth of said plurality of teeth of said first sprocket;

said second elevation is elevated above the circle of said first sprocket;

said second elevation is configured to support a portion of a chain during at least a portion of a transferring of a chain between said first sprocket and an adjacent sprocket;

a link support plate;

said link support plate of said first sprocket is configured to accomodate and support a portion of a chain during at least a portion of a transferring of a chain between said first sprocket and an adjacent sprocket; and said link support plate of said first sprocket is disposed on said second side of said first sprocket.

14. A sprocket for a multi-sprocket arrangement for a manually-powered vehicle having at least one wheel, at least one wheel hub mounted on the at least one wheel, and a chain for providing a force to be transferred to the at least one wheel hub, said sprocket comprising:

means for connecting said sprocket with a wheel hub;

a plurality of teeth for receiving a force from a chain and transferring a force to a wheel hub;

a valley being formed between each tooth of said plurality of teeth;

the bottom of each valley lying on a circle;

means for facilitating transfer of a chain between said sprocket and an adjacent sprocket of the multi-sprocket arrangement;

said means for facilitating transfer of a chain comprising:

at least one tooth of said plurality of teeth of said sprocket being omitted to thereby form a multiple-tooth space in the form of a double-tooth space;

an elevation being disposed in the double-tooth space;

said elevation being disposed substantially adjacent a tooth of said plurality of teeth, the tooth immediately following the multiple-tooth space in the normal direction of rotation of said sprocket;

said elevation being elevated above the circle; and said elevation being configured to support a portion of a chain during at least a portion of a transferring of a chain between said sprocket and an adjacent sprocket.

15. The sprocket according to claim 14, wherein:

said sprocket is configured to rotate about an axis of rotation;

said sprocket is configured to rotate in a plane of rotation;

said means for facilitating transfer of a chain further comprises:

a tooth of said plurality of teeth;

said tooth is disposed substantially adjacent the multiple-tooth gap;

said tooth comprises an indentation;

said indentation is disposed on the side of said sprocket for facing an adjacent sprocket;

said indentation comprises a first surface of said tooth and a second surface of said tooth;

said first surface is substantially disposed along the direction of rotation of said sprocket;

said first surface is configured to support a portion of a chain during at least a portion of a transferring of a chain between said sprocket and an adjacent sprocket;

said second surface is transverse to said first surface;

said second surface is oriented at a skew with respect to the plane of rotation of said sprocket; and said second surface is configured to guide a chain during at least a portion of a transferring of a chain between said sprocket and an adjacent sprocket.

16. The sprocket according to claim 15, wherein:

said tooth comprising said indentation is a first tooth;

said indentation of said first tooth is a first indentation;

said first tooth is disposed on a first side of the multiple-tooth space in the normal direction of rotation of said sprocket;

said plurality of teeth of said sprocket comprise a second tooth;

said second tooth is disposed substantially adjacent the multiple-tooth space;

said second tooth is disposed on the opposite side of the multiple-tooth space from said first tooth;

said second tooth comprises a second indentation;

said second indentation is disposed on the same side of said sprocket as is said first indentation;

said second indentation comprises a first surface of said second tooth and a second surface of said second tooth;

said first surface of said second tooth is substantially disposed along the direction of rotation of said sprocket;

said first surface of said second tooth is configured to support a portion of a chain during at least a portion of a transferring of a chain between said sprocket and an adjacent sprocket;

said second surface of said second tooth is transverse to said first surface of said second tooth;

said second surface of said second tooth is oriented at a skew with respect to the plane of rotation of said sprocket; and said second surface of said second tooth is configured to guide a chain during at least a portion of a transferring of a chain between said sprocket and an adjacent sprocket.

17. The sprocket according to claim 16, wherein:

said first tooth immediately precedes the multiple-tooth space in the normal direction of rotation of said sprocket; and said second tooth is the second tooth following the multiple-tooth space in the normal direction of travel.

18. The sprocket according to claim 17, wherein the multi-sprocket arrangement comprises a second sprocket disposed adjacent said sprocket; the second sprocket has a larger diameter than said sprocket; the second sprocket comprises a link support plate; the link support plate is disposed adjacent said sprocket; the link support plate comprises a lateral surface of the second sprocket; the lateral surface of the link support plate is configured to accomodate and support a portion of a chain during at least a portion of a transferring of a chain between said sprocket and the second sprocket, said sprocket comprising:

means for facilitating transfer of a chain between said sprocket and a second sprocket;

said means for facilitating transfer of a chain between said sprocket and a second sprocket comprises:

a third tooth of said plurality of teeth of said sprocket;

said third tooth is configured to be disposed substantially adjacent said link support plate;

said third tooth comprises a first side and a second side;
said first side of said third tooth is configured to be disposed adjacent a second sprocket;
said second side of said tooth is opposite said first side of said third tooth;
said third tooth comprises a bevel configured in the axial direction of the axis of rotation; and
said bevel of said third tooth is disposed on said second side of said tooth.

19. The sprocket according to claim 18 wherein said third tooth immediately follows the multiple-tooth space in the normal direction of rotation of said sprocket.

20. The sprocket according to claim 19, wherein:
said means for facilitating transfer of a chain comprises a link support plate; and
said link support plate is disposed on said second side of said sprocket.

* * * * *

UNITED STATES PATENT AND TRADEMARK OFFICE
CERTIFICATE OF CORRECTION

PATENT NO. : 5,716,297
DATED : February 10, 1998
INVENTOR(S) : Jörg BODMER

It is certified that error appears in the above-identified patent and that said Letters Patent is hereby corrected as shown below:

In column 22, line 14, after 'links, delete "end" and insert --and--.

Signed and Sealed this

Second Day of June, 1998

Attest:

BRUCE LEHMAN

*Attesting Officer*  *Commissioner of Patents and Trademarks*